US012675678B1

(12) United States Patent
Ko et al.

(10) Patent No.: US 12,675,678 B1
(45) Date of Patent: Jul. 7, 2026

(54) UNIFIED MEMORY FOR INTEGRATED CIRCUIT EXECUTING NEURAL NETWORK

(71) Applicant: Amazon Technologies, Inc., Seattle, WA (US)

(72) Inventors: Jung Ko, San Jose, CA (US); Kenneth Duong, San Jose, CA (US); Steven L. Teig, Menlo Park, CA (US); Won Rhee, Los Altos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1127 days.

(21) Appl. No.: 17/306,744

(22) Filed: May 3, 2021

Related U.S. Application Data

(60) Provisional application No. 63/178,933, filed on Apr. 23, 2021.

(51) Int. Cl.

| | |
|---|---|
| ***G06N 3/063*** | (2023.01) |
| ***G06F 9/22*** | (2006.01) |
| ***G06F 12/02*** | (2006.01) |
| ***G06F 12/06*** | (2006.01) |
| ***G06F 12/10*** | (2016.01) |

(52) U.S. Cl.
CPC ............. *G06N 3/063* (2013.01); *G06F 9/223* (2013.01); *G06F 12/0246* (2013.01); *G06F 12/06* (2013.01); *G06F 12/10* (2013.01)

(58) Field of Classification Search
CPC ..... G06N 3/063; G06F 9/223; G06F 12/0246; G06F 12/06; G06F 12/10
See application file for complete search history.

(56) References Cited

U.S. PATENT DOCUMENTS

| | | | | |
|---|---|---|---|---|
| 5,621,863 | A | 4/1997 | Boulet et al. | |
| 5,717,832 | A | 2/1998 | Steimle et al. | |
| 5,740,326 | A | 4/1998 | Boulet et al. | |
| 5,956,703 | A | 9/1999 | Turner et al. | |
| 9,201,608 | B2 * | 12/2015 | Hendry | G06F 12/08 |
| 9,710,265 | B1 | 7/2017 | Temam et al. | |
| 9,858,636 | B1 | 1/2018 | Lim et al. | |
| 9,904,874 | B2 | 2/2018 | Shoaib et al. | |
| 10,445,638 | B1 | 10/2019 | Amirineni et al. | |

(Continued)

FOREIGN PATENT DOCUMENTS

| | | | |
|---|---|---|---|
| CN | 108876698 | A | 11/2018 |
| CN | 108280514 | B | 10/2020 |

(Continued)

OTHER PUBLICATIONS

Achterhold, Jan, et al., "Variational Network Quantization," Proceedings of 6th International Conference on Learning Representations (ICLR 2018), Apr. 30-May 3, 2018, 18 pages, ICLR, Vancouver, BC, Canada.

(Continued)

*Primary Examiner* — Prasith Thammavong
(74) *Attorney, Agent, or Firm* — K&L Gates LLP

(57) ABSTRACT

Some embodiments provide an integrated circuit (IC). The IC includes a microprocessor circuit for loading configuration for a neural network and generating instructions for executing the neural network based on the configuration. The IC includes a neural network inference circuit for executing a neural network for input data according to instructions received from the central processing circuit. The IC includes an input processing circuit for receiving data and preparing input data for the neural network inference circuit. The IC includes a unified memory accessible by the microprocessor circuit, neural network inference circuit, and input processing circuit.

20 Claims, 21 Drawing Sheets

(56) References Cited

U.S. PATENT DOCUMENTS

| | | | | |
|---|---|---|---|---|
| 10,489,478 | B2 | 11/2019 | Lim et al. | |
| 10,515,303 | B2 | 12/2019 | Lie et al. | |
| 10,657,438 | B2 | 5/2020 | Lie et al. | |
| 10,664,310 | B2 | 5/2020 | Bokhari | |
| 10,740,434 | B1 | 8/2020 | Duong et al. | |
| 10,768,856 | B1 | 9/2020 | Diamant et al. | |
| 10,796,198 | B2 | 10/2020 | Franca-Neto | |
| 10,817,042 | B2 | 10/2020 | Desai et al. | |
| 10,853,738 | B1 | 12/2020 | Dockendorf et al. | |
| 10,970,630 | B1 | 4/2021 | Aimone | |
| 11,049,013 | B1 | 6/2021 | Duong et al. | |
| 11,138,292 | B1 | 10/2021 | Nair et al. | |
| 11,170,289 | B1 | 11/2021 | Duong et al. | |
| 11,250,326 | B1 | 2/2022 | Ko et al. | |
| 11,347,297 | B1 | 5/2022 | Ko et al. | |
| 11,423,289 | B2 | 8/2022 | Judd et al. | |
| 11,531,868 | B1 | 12/2022 | Duong et al. | |
| 11,537,853 | B1 | 12/2022 | Afzal | |
| 11,568,227 | B1 | 1/2023 | Ko et al. | |
| 11,586,910 | B1 | 2/2023 | Duong et al. | |
| 11,868,867 | B1 | 1/2024 | Afzal | |
| 11,868,901 | B1 | 1/2024 | Thomas et al. | |
| 11,977,916 | B2 | 5/2024 | Kim | |
| 2004/0078403 | A1 | 4/2004 | Scheuermann et al. | |
| 2005/0021874 | A1* | 1/2005 | Georgiou | G06F 15/167 709/250 |
| 2011/0106741 | A1 | 5/2011 | Denneau | |
| 2011/0307685 | A1 | 12/2011 | Song | |
| 2015/0286525 | A1* | 10/2015 | Singh | G06F 11/165 714/768 |
| 2016/0239706 | A1 | 8/2016 | Dijkman et al. | |
| 2016/0320994 | A1* | 11/2016 | Chun | G06F 3/0659 |
| 2016/0342893 | A1 | 11/2016 | Ross et al. | |
| 2017/0011006 | A1 | 1/2017 | Saber et al. | |
| 2017/0011288 | A1 | 1/2017 | Brothers et al. | |
| 2017/0243110 | A1 | 8/2017 | Esquivel et al. | |
| 2017/0300828 | A1 | 10/2017 | Feng et al. | |
| 2017/0323196 | A1 | 11/2017 | Gibson et al. | |
| 2017/0344882 | A1 | 11/2017 | Ambrose | |
| 2018/0018559 | A1 | 1/2018 | Yakopcic et al. | |
| 2018/0025268 | A1 | 1/2018 | Teig et al. | |
| 2018/0046458 | A1 | 2/2018 | Kuramoto | |
| 2018/0046900 | A1 | 2/2018 | Dally et al. | |
| 2018/0046905 | A1 | 2/2018 | Li et al. | |
| 2018/0046916 | A1 | 2/2018 | Dally et al. | |
| 2018/0101763 | A1 | 4/2018 | Barnard et al. | |
| 2018/0114569 | A1 | 4/2018 | Strachan et al. | |
| 2018/0121196 | A1 | 5/2018 | Temam et al. | |
| 2018/0121796 | A1 | 5/2018 | Deisher et al. | |
| 2018/0164866 | A1 | 6/2018 | Turakhia et al. | |
| 2018/0181406 | A1 | 6/2018 | Kuramoto | |
| 2018/0189229 | A1 | 7/2018 | Desoli et al. | |
| 2018/0189638 | A1 | 7/2018 | Nurvitadhi et al. | |
| 2018/0197068 | A1 | 7/2018 | Narayanaswami et al. | |
| 2018/0246855 | A1 | 8/2018 | Redfern et al. | |
| 2018/0285719 | A1 | 10/2018 | Baum et al. | |
| 2018/0285726 | A1 | 10/2018 | Baum et al. | |
| 2018/0285727 | A1 | 10/2018 | Baum et al. | |
| 2018/0285736 | A1 | 10/2018 | Baum et al. | |
| 2018/0293490 | A1 | 10/2018 | Ma et al. | |
| 2018/0293493 | A1 | 10/2018 | Kalamkar et al. | |
| 2018/0293691 | A1 | 10/2018 | Nurvitadhi et al. | |
| 2018/0300600 | A1 | 10/2018 | Ma et al. | |
| 2018/0307494 | A1 | 10/2018 | Ould-Ahmed-Vall et al. | |
| 2018/0307950 | A1 | 10/2018 | Nealis et al. | |
| 2018/0307980 | A1 | 10/2018 | Barik et al. | |
| 2018/0307985 | A1 | 10/2018 | Appu et al. | |
| 2018/0308202 | A1 | 10/2018 | Appu et al. | |
| 2018/0314492 | A1 | 11/2018 | Fais et al. | |
| 2018/0314941 | A1 | 11/2018 | Lie et al. | |
| 2018/0315158 | A1 | 11/2018 | Nurvitadhi et al. | |
| 2018/0322386 | A1 | 11/2018 | Sridharan et al. | |
| 2018/0322387 | A1 | 11/2018 | Sridharan et al. | |
| 2018/0329868 | A1 | 11/2018 | Chen et al. | |
| 2018/0365794 | A1 | 12/2018 | Lee et al. | |
| 2018/0373975 | A1 | 12/2018 | Yu et al. | |
| 2019/0012296 | A1 | 1/2019 | Hsieh et al. | |
| 2019/0026078 | A1 | 1/2019 | Bannon et al. | |
| 2019/0026237 | A1 | 1/2019 | Talpes et al. | |
| 2019/0026249 | A1 | 1/2019 | Talpes et al. | |
| 2019/0041961 | A1 | 2/2019 | Desai et al. | |
| 2019/0057036 | A1 | 2/2019 | Mathuriya et al. | |
| 2019/0073585 | A1 | 3/2019 | Pu et al. | |
| 2019/0087713 | A1 | 3/2019 | Lamb et al. | |
| 2019/0095776 | A1 | 3/2019 | Kfir et al. | |
| 2019/0114499 | A1 | 4/2019 | Delaye et al. | |
| 2019/0114534 | A1* | 4/2019 | Teng | G06N 3/063 |
| 2019/0138891 | A1 | 5/2019 | Kim et al. | |
| 2019/0147338 | A1 | 5/2019 | Pau et al. | |
| 2019/0156180 | A1 | 5/2019 | Nomura et al. | |
| 2019/0171927 | A1 | 6/2019 | Diril et al. | |
| 2019/0179635 | A1 | 6/2019 | Jiao et al. | |
| 2019/0180167 | A1 | 6/2019 | Huang et al. | |
| 2019/0187983 | A1 | 6/2019 | Ovsiannikov et al. | |
| 2019/0196970 | A1 | 6/2019 | Han et al. | |
| 2019/0205094 | A1 | 7/2019 | Diril et al. | |
| 2019/0205358 | A1 | 7/2019 | Diril et al. | |
| 2019/0205736 | A1 | 7/2019 | Bleiweiss et al. | |
| 2019/0205739 | A1 | 7/2019 | Liu et al. | |
| 2019/0205740 | A1 | 7/2019 | Judd et al. | |
| 2019/0205780 | A1 | 7/2019 | Sakaguchi | |
| 2019/0236437 | A1 | 8/2019 | Shin et al. | |
| 2019/0236445 | A1 | 8/2019 | Das et al. | |
| 2019/0266217 | A1 | 8/2019 | Arakawa et al. | |
| 2019/0266479 | A1 | 8/2019 | Singh et al. | |
| 2019/0294413 | A1 | 9/2019 | Vantrease et al. | |
| 2019/0294959 | A1 | 9/2019 | Vantrease et al. | |
| 2019/0294968 | A1 | 9/2019 | Vantrease et al. | |
| 2019/0303741 | A1 | 10/2019 | Appuswamy et al. | |
| 2019/0303749 | A1 | 10/2019 | Appuswamy et al. | |
| 2019/0303750 | A1 | 10/2019 | Kumar et al. | |
| 2019/0325296 | A1 | 10/2019 | Fowers et al. | |
| 2019/0332925 | A1 | 10/2019 | Modha | |
| 2019/0340493 | A1* | 11/2019 | Coenen | G06N 3/08 |
| 2019/0347559 | A1 | 11/2019 | Kang et al. | |
| 2019/0385046 | A1 | 12/2019 | Cassidy et al. | |
| 2020/0005131 | A1 | 1/2020 | Nakahara et al. | |
| 2020/0042856 | A1 | 2/2020 | Datta et al. | |
| 2020/0042859 | A1 | 2/2020 | Mappouras et al. | |
| 2020/0089506 | A1 | 3/2020 | Power et al. | |
| 2020/0117597 | A1* | 4/2020 | Huang | G06N 3/063 |
| 2020/0125926 | A1 | 4/2020 | Choudhury | |
| 2020/0134461 | A1 | 4/2020 | Chai et al. | |
| 2020/0234114 | A1 | 7/2020 | Rakshit et al. | |
| 2020/0257930 | A1 | 8/2020 | Nahr et al. | |
| 2020/0272907 | A1 | 8/2020 | Jin | |
| 2020/0301668 | A1 | 9/2020 | Li | |
| 2020/0301739 | A1 | 9/2020 | Xu | |
| 2020/0364545 | A1 | 11/2020 | Shattil | |
| 2020/0380344 | A1 | 12/2020 | Lie et al. | |
| 2021/0110236 | A1 | 4/2021 | Shibata | |
| 2021/0173787 | A1 | 6/2021 | Nagy et al. | |
| 2021/0182684 | A1 | 6/2021 | Zappi | |
| 2021/0232897 | A1 | 7/2021 | Bichler | |
| 2021/0241082 | A1 | 8/2021 | Nagy et al. | |
| 2021/0287074 | A1 | 9/2021 | Coenen | |
| 2022/0004854 | A1 | 1/2022 | Lee | |
| 2022/0121914 | A1 | 4/2022 | Huang et al. | |
| 2022/0335562 | A1 | 10/2022 | Surti et al. | |
| 2022/0414437 | A1 | 12/2022 | Liu | |
| 2023/0418666 | A1* | 12/2023 | Puppala | G06F 15/8015 |

FOREIGN PATENT DOCUMENTS

| | | | |
|---|---|---|---|
| GB | 2568086 | A | 5/2019 |
| WO | 2020044527 | A1 | 3/2020 |

OTHER PUBLICATIONS

Andri, Renzo, et al., "YodaNN: An Architecture for Ultra-Low Power Binary-Weight CNN Acceleration," IEEE Transactions on Computer-Aided Design of Integrated Circuits and Systems, Mar. 14, 2017, 14 pages, IEEE, New York, NY, USA.

(56) References Cited

OTHER PUBLICATIONS

Ardakani, Arash, et al., "Sparsely-Connected Neural Networks: Towards Efficient VLSI Implementation of Deep Neural Networks," Proceedings of the 5th International Conference on Learning Representations (ICLR 2017), Apr. 24-26, 2017, 14 pages, ICLR, Toulon, France.
Bagherinezhad, Hessam, et al., "LCNN: Look-up Based Convolutional Neural Network," Proceedings of 2017 IEEE Conference on Computer Vision and Pattern Recognition (CVPR 2017), Jul. 21-26, 2017, 10 pages, IEEE, Honolulu, HI, USA.
Bang, Suyoung, et al., "A 288 µW Programmable Deep-Learning Processor with 270KB On-Chip Weight Storage Using Non-Uniform Memory Hierarchy for Mobile Intelligence," Proceedings of 2017 IEEE International Solid-State Circuits Conference (ISSCC 2017), Feb. 5-7, 2017, 3 pages, IEEE, San Francisco, CA, USA.
Bong, Kyeongryeol, et al., "A 0.62mW Ultra-Low-Power Convolutional-Neural-Network Face-Recognition Processor and a CIS Integrated with Always-On Haar-Like Face Detector," Proceedings of 2017 IEEE International Solid-State Circuits Conference (ISSCC 2017), Feb. 5-7, 2017, 3 pages, IEEE, San Francisco, CA, USA.
Boo, Yoonho, et al., "Structured Sparse Ternary Weight Coding of Deep Neural Networks for Efficient Hardware Implementations," 2017 IEEE Workshop on Signal Processing Systems (SiPS), Oct. 3-5, 2017, 6 pages, IEEE, Lorient, France.
Chen, Yu-Hsin, et al., "Eyeriss: A Spatial Architecture for Energy-Efficient Dataflow for Convolutional Neural Networks," Proceedings of 2016 ACM/IEEE 43rd Annual International Symposium on Computer Architecture (ISCA 2016), Jun. 18-22, 2016, 13 pages, IEEE, Seoul, South Korea.
Chen, Yu-Hsin, et al., "Using Dataflow to Optimize Energy Efficiency of Deep Neural Network Accelerators," IEEE Micro, Jun. 14, 2017, 10 pages, vol. 37, Issue 3, IEEE, New York, NY, USA.
Courbariaux, Matthieu, et al., "Binarized Neural Networks: Training Neural Networks with Weights and Activations Constrained to +1 or -1," Mar. 17, 2016, 11 pages, arXiv:1602.02830v3, Computing Research Repository (CoRR)—Cornell University, Ithaca, NY, USA.
Courbariaux, Matthieu, et al., "BinaryConnect: Training Deep Neural Networks with Binary Weights during Propagations," Proceedings of the 28th International Conference on Neural Information Processing Systems (NIPS 15), Dec. 7-12, 2015, 9 pages, MIT Press, Montreal, Canada.
Emer, Joel, et al., "Hardware Architectures for Deep Neural Networks," CICS/MTL Tutorial, Mar. 27, 2017, 258 pages, Massachusetts Institute of Technology, Cambridge, MA, USA, retrieved from http://www.rle.mit.edu/eems/wp-content/uploads/2017/03/Tutorial-on-DNN-CICS-MTL.pdf.
Fu, Yao, et al., "Embedded Vision with INT8 Optimization on Xilinx Devices," WP490 (v1.0.1), Apr. 19, 2017, 15 pages, Xilinx, Inc., San Jose, CA, USA.
Guo, Yiwen, et al., "Network Sketching: Exploring Binary Structure in Deep CNNs," 2017 IEEE Conference on Computer Vision and Pattern Recognition (CVPR 2017), Jul. 21-26, 2017, 9 pages, IEEE, Honolulu, HI.
He, Zhezhi, et al., "Optimize Deep Convolutional Neural Network with Ternarized Weights and High Accuracy," Jul. 20, 2018, 8 pages, arXiv: 1807.07948v1, Computing Research Repository (CoRR)—Cornell University, Ithaca, NY, USA.
Hegde, Kartik, et al., "UCNN: Exploiting Computational Reuse in Deep Neural Networks via Weight Repetition," Proceedings of the 45th Annual International Symposium on Computer Architecture (ISCA '18), Jun. 2-6, 2018, 14 pages, IEEE Press, Los Angeles, CA, USA.
Huan, Yuxiang, et al., "A Low-Power Accelerator for Deep Neural Networks with Enlarged Near-Zero Sparsity," May 22, 2017, 5 pages, arXiv:1705.08009v1, Computer Research Repository (CoRR)—Cornell University, Ithaca, NY, USA.
Jouppi, Norman, P., et al., "In-Datacenter Performance Analysis of a Tensor Processing Unit," Proceedings of the 44th Annual International Symposium on Computer Architecture (ISCA '17), Jun. 24-28, 2017, 17 pages, ACM, Toronto, ON, Canada.
Judd, Patrick, et al., "Cnvlutin2: Ineffectual-Activation-and-Weight-Free Deep Neural Network Computing," Apr. 29, 2017, 6 pages, arXiv:1705.00125v1, Computer Research Repository (CoRR)—Cornell University, Ithaca, NY, USA.
Leng, Cong, et al., "Extremely Low Bit Neural Network: Squeeze the Last Bit Out with ADMM," Proceedings of 32nd AAAI Conference on Artificial Intelligence (AAAI-18), Feb. 2-7, 2018, 16 pages, Association for the Advancement of Artificial Intelligence, New Orleans, LA, USA.
Li, Fengfu, et al., "Ternary Weight Networks," May 16, 2016, 9 pages, arXiv:1605.04711v1, Computing Research Repository (CoRR)—Cornell University, Ithaca, NY, USA.
Merolla, Paul, et al., "Deep Neural Networks are Robust to Weight Binarization and Other Non-linear Distortions," Jun. 7, 2016, 10 pages, arXiv:1606.01981v1, Computing Research Repository (CoRR)—Cornell University, Ithaca, NY, USA.
Moons, Bert, et al., "Envision: A 0.26-to-10TOPS/W Subword-Parallel Dynamic-Voltage-Accuracy-Frequency-Scalable Convolutional Neural Network Processor in 28nm FDSOI," Proceedings of 2017 IEEE International Solid-State Circuits Conference (ISSCC 2017), Feb. 5-7, 2017, 3 pages, IEEE, San Francisco, CA, USA.
Moshovos, Andreas, et al., "Exploiting Typical Values to Accelerate Deep Learning," Computer, May 24, 2018, 13 pages, vol. 51-Issue 5, IEEE Computer Society, Washington, D.C.
Non-Published Commonly Owned Related U.S. Appl. No. 17/306,742 with similar specification, filed May 3, 2021, 78 pages, Perceive Corporation.
Non-Published Commonly Owned Related U.S. Appl. No. 17/306,745 with similar specification, filed May 3, 2021, 78 pages, Perceive Corporation.
Park, Jongsoo, et al., "Faster CNNs with Direct Sparse Convolutions and Guided Pruning," Jul. 28, 2017, 12 pages, arXiv: 1608.01409v5, Computer Research Repository (CoRR)—Cornell University, Ithaca, NY, USA.
Rastegari, Mohammad, et al., "XNOR-Net: ImageNet Classification Using Binary Convolutional Neural Networks," Proceedings of 2016 European Conference on Computer Vision (ECCV '16), Oct. 8-16, 2016, 17 pages, Lecture Notes in Computer Science, vol. 9908, Springer, Cham, Amsterdam, Netherlands.
Ren, Mengye, et al., "SBNet: Sparse Blocks Network for Fast Inference," Jan. 7, 2018, 10 pages, arXiv:1801.02108v1, Computer Research Repository (CoRR)—Cornell University, Ithaca, NY, USA.
Shayer, Oran, et al., "Learning Discrete Weights Using the Local Reparameterization Trick," Proceedings of 6th International Conference on Learning Representations (ICLR 2018), Apr. 30-May 3, 2018, 12 pages, ICLR, Vancouver, BC, Canada.
Shin, Dongjoo, et al., "DNPU: An 8.1TOPS/W Reconfigurable CNN-RNN Processor for General-Purpose Deep Neural Networks," Proceedings of 2017 IEEE International Solid-State Circuits Conference (ISSCC 2017), Feb. 5-7, 2017, 3 pages, IEEE, San Francisco, CA, USA.
Sim, Jaehyeong, et al., "A 1.42TOPS/W Deep Convolutional Neural Network Recognition Processor for Intelligent OE Systems," Proceedings of 2016 IEEE International Solid-State Circuits Conference (ISSCC 2016), Jan. 31-Feb. 4, 2016, 3 pages, IEEE, San Francisco, CA, USA.
Sze, Vivienne, et al., "Efficient Processing of Deep Neural Networks: A Tutorial and Survey," Aug. 13, 2017, 32 pages, arXiv:1703.09039v2, Computer Research Repository (CoRR)—Cornell University, Ithaca, NY, USA.
Wang, Min, et al., "Factorized Convolutional Neural Networks," 2017 IEEE International Conference on Computer Vision Workshops (ICCVW '17), Oct. 22-29, 2017, 9 pages, IEEE, Venice, Italy.
Wen, Wei, et al., "Learning Structured Sparsity in Deep Neural Networks," Oct. 18, 2016, 10 pages, arXiv: 1608.03665v4, Computer Research Repository (CoRR)—Cornell University, Ithaca, NY, USA.
Yang, Xuan, et al., "DNN Dataflow Choice Is Overrated," Sep. 10, 2018, 13 pages, arXiv:1809.04070v1, Computer Research Repository (CoRR)—Cornell University, Ithaca, NY, USA.

(56) References Cited

OTHER PUBLICATIONS

Zhang, Shijin, et al., "Cambricon-X: An Accelerator for Sparse Neural Networks," 2016 49th Annual IEEE/ACM International Symposium on Microarchitecture (MICRO '16), Oct. 15-19, 2016, 12 pages, IEEE, Taipei, Taiwan.
Zhu, Chenzhuo, et al., "Trained Ternary Quantization," Dec. 4, 2016, 9 pages, arXiv: 1612.01064v1, Computing Research Repository (CoRR)—Cornell University, Ithaca, NY, USA.
Abtahi, Tahmid, et al., "Accelerating Convolutional Neural Network With FFT on Embedded Hardware," IEEE Transactions on Very Large Scale Integration (VLSI) Systems, Sep. 2018, 14 pages, vol. 26, No. 9, IEEE.
Ardakani, Arash, et al., "An Architecture to Accelerate Convolution in Deep Neural Networks," IEEE Transactions on Circuits and Systems I: Regular Papers, Oct. 17, 2017, 14 pages, vol. 65, No. 4, IEEE.
Iu, Shaoli, et al., "Cambricon: An Instruction Set Architecture for Neural Networks," 2016 ACM/IEEE 43rd Annual International Symposium on Computer Architecture, Jun. 18-22, 2016, 13 pages, IEEE, Seoul, South Korea.
Carbon, A., et al., "Pleura: A Scalable Energy-Efficient Programmable Hardware Accelerator for Neural Networks," 2018 Design, Automation & Test in Europe Conference & Exhibition (Date 2018), Mar. 19-23, 2018, 6 pages, IEEE, Dresden, Germany.
Gokhale, Vinayak, et al., "Snowflake: A Model Agnostic Accelerator for Deep Convolutional Neural Networks," Aug. 8, 2017, 11 pages, arXiv:1708.02579v1, Computing Research Repository (CoRR)—Cornell University, Ithaca, NY, USA.
Jin, Canran,, et al., "Sparse Ternary Connect: Convolutional Neural Networks Using Ternarized Weights with Enhanced Sparsity," 2018 23rd Asia and South Pacific Design Automation Conference (ASP-DAC), Jan. 22-25, 2018, 6 pages, IEEE, Jeju, South Korea.
Chen, Tianqi, et al., "TVM: An Automated End-to-End Optimizing Compiler for Deep Learning," Proceedings of the 13th USENIX Symposium on Operating Systems Design and Implementation (OSDI '18), Oct. 8-10, 2018, 17 pages, USENIX Association, Carlsbad, CA, US.
Han, Song, "Efficient Methods and Hardware for Deep Learning," September 217, 125 pages, Stanford University, Palo Alto, CA, USA.

* cited by examiner

800

| | | | |
|---|---|---|---|
| Core 0 Memory | SRAM 0 | SRAM 1 | SRAM 2 | SRAM 3 |
| Core 1 Memory | SRAM 0 | SRAM 1 | SRAM 2 | SRAM 3 |
| Core 2 Memory | SRAM 0 | SRAM 1 | SRAM 2 | SRAM 3 |
| Core 3 Memory | SRAM 0 | SRAM 1 | SRAM 2 | SRAM 3 |

Allocated to Neural Network Computation Fabric

800

900

| Virtual | Physical |
|---|---|
| SRAM 0 | Core 0, SRAM 3 |
| SRAM 1 | Core 1, SRAM 3 |
| SRAM 2 | Core 2, SRAM 3 |
| SRAM 3 | Core 3, SRAM 2 |
| SRAM 4 | Core 3, SRAM 3 |

1100

Physical Bank No.                              Logical Bank No.

| Physical Bank No. | | Logical Bank No. |
|:---:|:---:|:---:|
| 9 | cpu cache | 9 |
| 8 | cpu cache | 8 |
| 7 | cpu cache | 7 |
| 6 | Swap | 6 |
| 5 | Swap | 5 |
| 4 | Write Network input | 4 |
| 3 | Write Network input | 3 |
| 2 | Activations | 2 |
| 1 | Weights + Activations | 1 |
| 0 | Weights | 0 |

1100

Initial Condition

| Phys. | | Log. |
|---|---|---|
| 9 | cpu cache | 9 |
| 8 | cpu cache | 8 |
| 7 | cpu cache | 7 |
| 6 | Swap | 6 |
| 5 | Swap | 5 |
| 4 | Write Network input | 4 |
| 3 | Write Network input | 3 |
| 2 | Activations | 2 |
| 1 | Weights + Activations | 1 |
| 0 | Weights | 0 |

1205

Execute Even Input (Read/Write Odd I/O)

| Phys. | | Log. |
|---|---|---|
| 9 | cpu cache | 9 |
| 8 | cpu cache | 8 |
| 7 | cpu cache | 7 |
| 6 | Write Network input | 3 |
| 5 | Write Network input | 4 |
| 4 | Swap | 6 |
| 3 | Swap | 5 |
| 2 | Activations | 2 |
| 1 | Weights + Activations | 1 |
| 0 | Weights | 0 |

1210

Execute Odd Input (Read/Write Even I/O)

| Phys. | | Log. |
|---|---|---|
| 9 | cpu cache | 9 |
| 8 | cpu cache | 8 |
| 7 | cpu cache | 7 |
| 6 | Swap | 6 |
| 5 | Swap | 5 |
| 4 | Write Network input | 4 |
| 3 | Write Network input | 3 |
| 2 | Activations | 2 |
| 1 | Weights + Activations | 1 |
| 0 | Weights | 0 |

1215

Execute Even Input (Read/Write Odd I/O)

| Phys. | | Log. |
|---|---|---|
| 9 | cpu cache | 9 |
| 8 | cpu cache | 8 |
| 7 | cpu cache | 7 |
| 6 | Write Network input | 3 |
| 5 | Write Network input | 4 |
| 4 | Swap | 6 |
| 3 | Swap | 5 |
| 2 | Activations | 2 |
| 1 | Weights + Activations | 1 |
| 0 | Weights | 0 |

1220

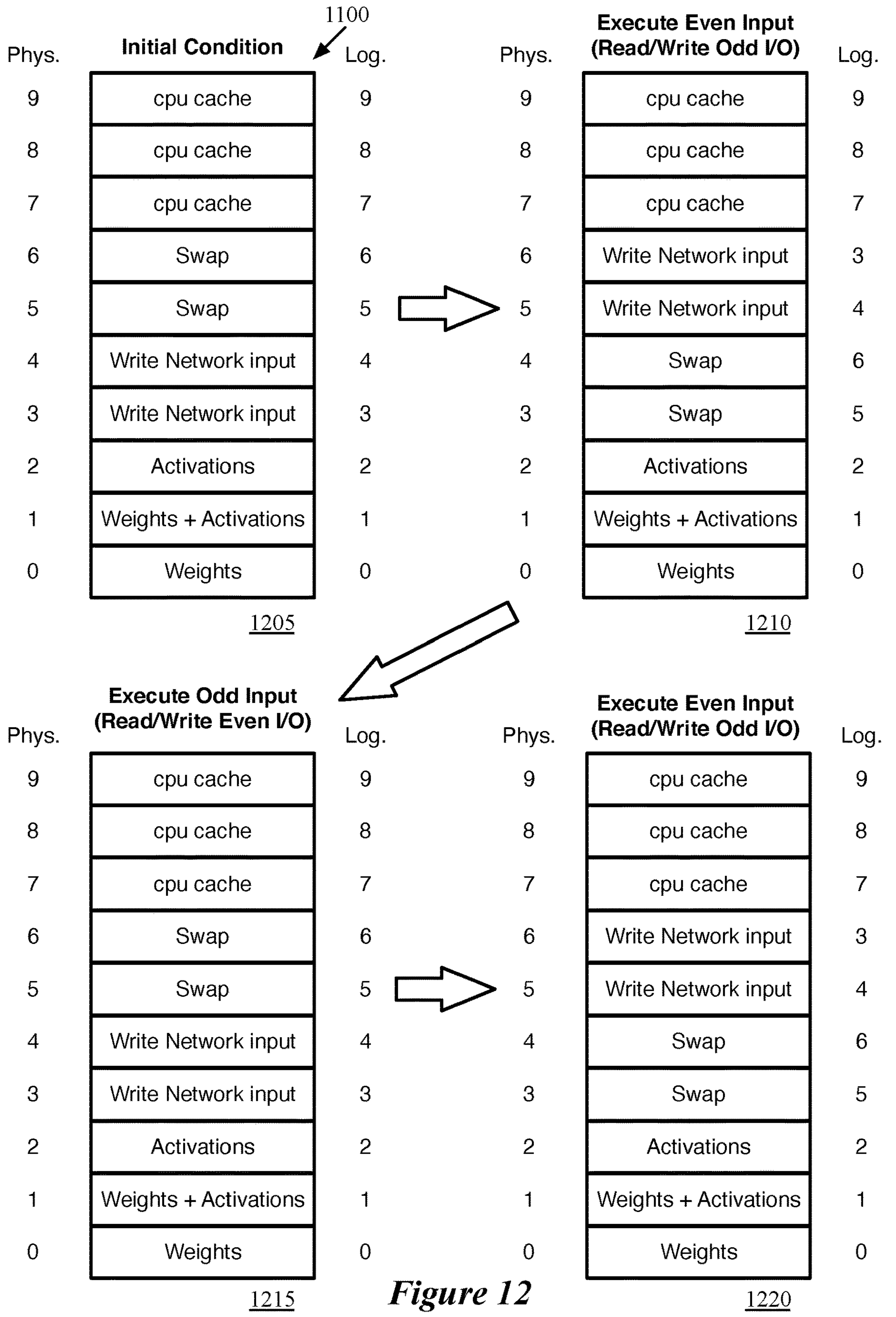

*Figure 12*

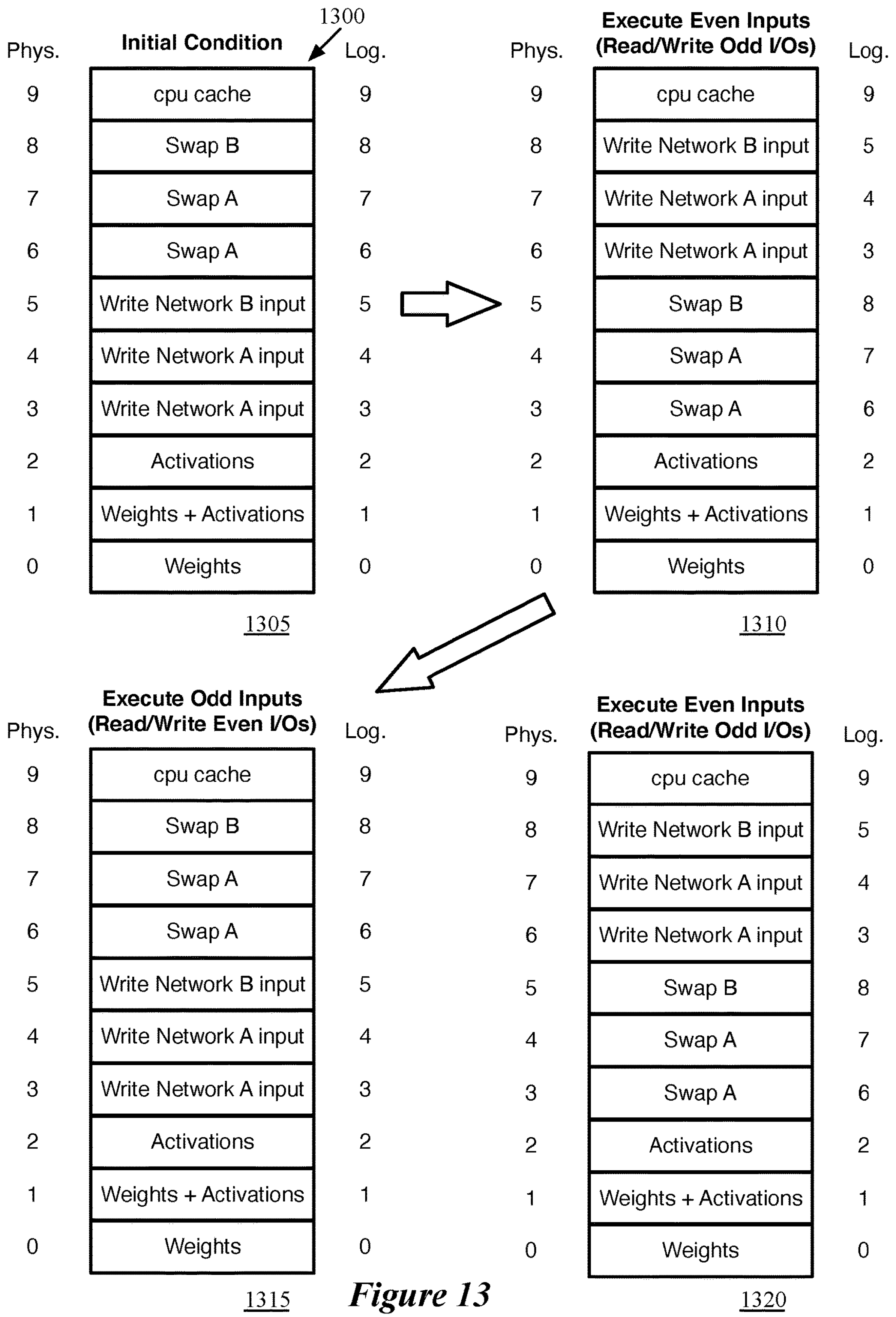

Initial Condition

| Phys. | | Log. |
|---|---|---|
| 9 | cpu cache | 9 |
| 8 | Swap B | 8 |
| 7 | Swap A | 7 |
| 6 | Swap A | 6 |
| 5 | Write Network B input | 5 |
| 4 | Write Network A input | 4 |
| 3 | Write Network A input | 3 |
| 2 | Activations | 2 |
| 1 | Weights + Activations | 1 |
| 0 | Weights | 0 |

1305

Execute Even Inputs (Read/Write Odd I/Os)

| Phys. | | Log. |
|---|---|---|
| 9 | cpu cache | 9 |
| 8 | Write Network B input | 5 |
| 7 | Write Network A input | 4 |
| 6 | Write Network A input | 3 |
| 5 | Swap B | 8 |
| 4 | Swap A | 7 |
| 3 | Swap A | 6 |
| 2 | Activations | 2 |
| 1 | Weights + Activations | 1 |
| 0 | Weights | 0 |

1310

Execute Odd Inputs (Read/Write Even I/Os)

| Phys. | | Log. |
|---|---|---|
| 9 | cpu cache | 9 |
| 8 | Swap B | 8 |
| 7 | Swap A | 7 |
| 6 | Swap A | 6 |
| 5 | Write Network B input | 5 |
| 4 | Write Network A input | 4 |
| 3 | Write Network A input | 3 |
| 2 | Activations | 2 |
| 1 | Weights + Activations | 1 |
| 0 | Weights | 0 |

1315

Execute Even Inputs (Read/Write Odd I/Os)

| Phys. | | Log. |
|---|---|---|
| 9 | cpu cache | 9 |
| 8 | Write Network B input | 5 |
| 7 | Write Network A input | 4 |
| 6 | Write Network A input | 3 |
| 5 | Swap B | 8 |
| 4 | Swap A | 7 |
| 3 | Swap A | 6 |
| 2 | Activations | 2 |
| 1 | Weights + Activations | 1 |
| 0 | Weights | 0 |

1320

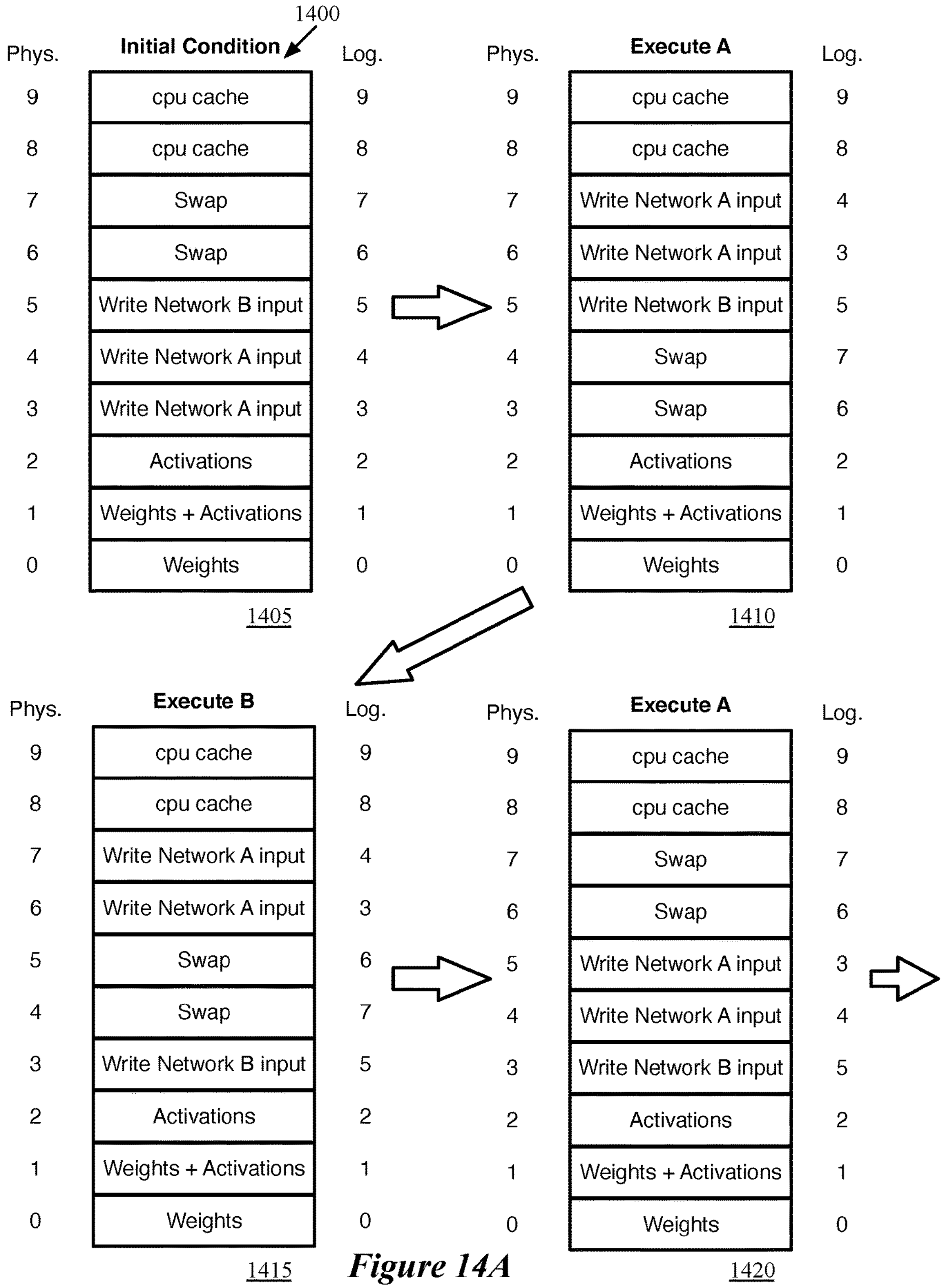

Initial Condition

| Phys. | | Log. |
|---|---|---|
| 9 | cpu cache | 9 |
| 8 | cpu cache | 8 |
| 7 | Swap | 7 |
| 6 | Swap | 6 |
| 5 | Write Network B input | 5 |
| 4 | Write Network A input | 4 |
| 3 | Write Network A input | 3 |
| 2 | Activations | 2 |
| 1 | Weights + Activations | 1 |
| 0 | Weights | 0 |

1405

Execute A

| Phys. | | Log. |
|---|---|---|
| 9 | cpu cache | 9 |
| 8 | cpu cache | 8 |
| 7 | Write Network A input | 4 |
| 6 | Write Network A input | 3 |
| 5 | Write Network B input | 5 |
| 4 | Swap | 7 |
| 3 | Swap | 6 |
| 2 | Activations | 2 |
| 1 | Weights + Activations | 1 |
| 0 | Weights | 0 |

1410

Execute B

| Phys. | | Log. |
|---|---|---|
| 9 | cpu cache | 9 |
| 8 | cpu cache | 8 |
| 7 | Write Network A input | 4 |
| 6 | Write Network A input | 3 |
| 5 | Swap | 6 |
| 4 | Swap | 7 |
| 3 | Write Network B input | 5 |
| 2 | Activations | 2 |
| 1 | Weights + Activations | 1 |
| 0 | Weights | 0 |

1415

Execute A

| Phys. | | Log. |
|---|---|---|
| 9 | cpu cache | 9 |
| 8 | cpu cache | 8 |
| 7 | Swap | 7 |
| 6 | Swap | 6 |
| 5 | Write Network A input | 3 |
| 4 | Write Network A input | 4 |
| 3 | Write Network B input | 5 |
| 2 | Activations | 2 |
| 1 | Weights + Activations | 1 |
| 0 | Weights | 0 |

1420

1800

Start

Load weights for node into filter slice buffers of one or more cores — 1805

Load input values for node into activation window buffer of the cores — 1810

Compute partial dot products in cores — 1815

Aggregate partial dot products in dot product bus — 1820

Provide aggregated dot product to an activation post-processor specified by configuration data — 1825

Perform linear function post-processing operations at the specified post-processor — 1830

Apply non-linear activation function at the specified post-processor to compute output of node — 1835

Provide computed node output to activation memory of a core specified by configuration data to be used as input to subsequent nodes — 1840

End

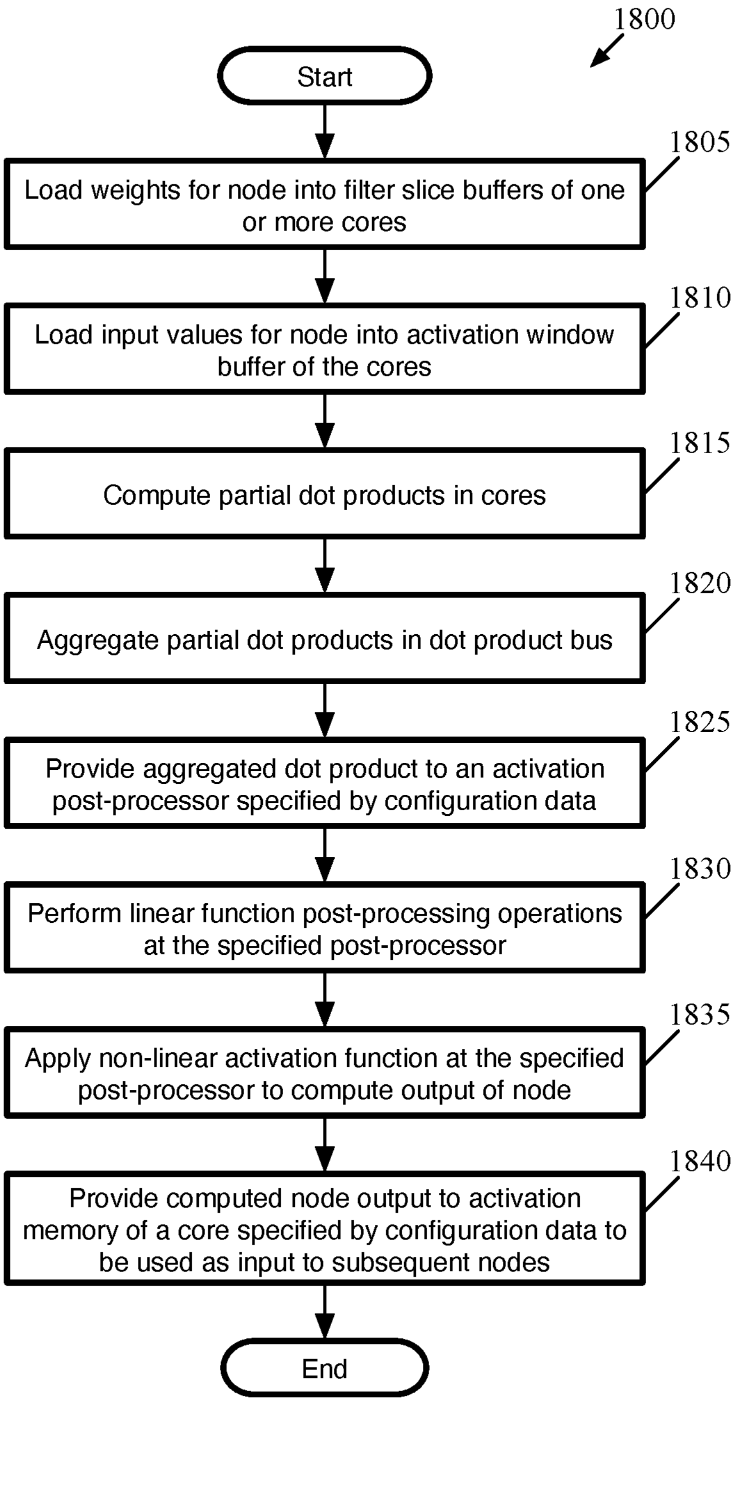

*Figure 18*

UNIFIED MEMORY FOR INTEGRATED CIRCUIT EXECUTING NEURAL NETWORK

BACKGROUND

A typical neural network receives input data (e.g., an image), performs a series of computations on that input data, and generates an output (e.g., a single value, set of values, etc.). Specialized hardware accelerators have been designed recently for executing these neural networks for streaming inputs (e.g., streaming video frames), with the accelerator repeatedly executing the network for subsequent inputs. These accelerators need to be able to receive the input, process that input, and provide the output in a short period of time. One of the sources of latency that can be improved is the writing of input to the memory used by the accelerator and reading of output from that memory.

BRIEF SUMMARY

Some embodiments provide an integrated circuit (IC) for executing a machine-trained network (e.g., a neural network). The IC of some embodiments includes a set of input processing circuits that prepares input data for the neural network, a neural network computation fabric (also referred to as a neural network inference circuit or a neural network accelerator) that can be configured to apply a neural network to a set of input data, a microprocessor circuit (e.g., a CPU) that controls the input processing circuits and configures the neural network computation fabric according to neural network program instructions, and a unified memory that is accessible by the input processing circuits, neural network computation fabric, and microprocessor circuit. In some embodiments, the unified memory allows for a first neural network input to be written to a first set of memory banks (shared by the input processing circuits and the neural network computation fabric) while the neural network computation fabric executes the neural network for a different input that was written to a second set of memory banks.

A typical neural network operates in layers, with each layer including numerous nodes. Examples of neural networks include feed-forward neural networks, regulatory feedback networks, radial basis function networks, recurrent networks, etc. In convolutional neural networks (a type of feed-forward network), a majority of the layers include computation nodes with both a linear function followed by a non-linear activation function (applied to the result of the linear function). The linear function is a dot product of input values (either the initial inputs based on the input data for the first layer, or outputs of the previous layer for subsequent layers) and predetermined (trained) weight values, along with bias (addition) and scale (multiplication) terms, which are also predetermined based on training. As such, for convolutional neural networks, the dot products are the primary computation that uses the most circuit resources.

The neural network computation fabric of some embodiments includes (i) a set of cores that compute dot products of activation values and corresponding weight values and (ii) a channel that aggregates these dot products and performs post-processing operations (as well as performs other operations), in order to compute the outputs of neural network computation nodes (i.e., hidden layer nodes or output nodes that compute the network outputs).

In some embodiments, at startup of the IC, the microprocessor loads neural network configuration data (e.g., weight values, scale and bias parameters, etc.) from off-chip storage and generates instructions for the neural network computation fabric to write the neural network parameters to memory. In addition, the microprocessor loads the neural network program instructions for the computation fabric to its own memory. These instructions are applied by the computation fabric to input data (e.g., images, audio clips, etc.) in order to execute the neural network. The instructions include, e.g., the memory locations to which input and/or intermediate values are written, configuration data specifying how to compute specific neural network nodes, etc. Upon the input processing circuit writing input data (e.g., data captured by a sensor on a device that incorporates the IC) to the unified memory, the microprocessor provides neural network program instructions to the computation fabric. Once the final output of the neural network is computed, the fabric provides this output back to the microprocessor, so that the microprocessor (or other circuitry on the device) can evaluate this output and perform any actions based on the output.

The microprocessor executes a controller, in some embodiments, that provides the neural network instructions to the computation fabric. Some embodiments provide these instructions to the computation fabric incrementally. For instance, in some embodiments, the system controller on the microprocessor initially loads the instructions for the first layer (or a first portion of the first layer) of the neural network, then waits for a signal from the fabric indicating that these instructions have been completed. Once the first portion of the network is completed by the fabric, the system controller provides the fabric with the instructions for the second portion (either a second portion of the first layer, or the second layer of the network), and so on until the network has been fully executed.

As mentioned, the neural network computation fabric includes numerous cores as well as a global channel that connects the cores, with the various data processing circuits configured by the hierarchical set of control circuits. These data processing circuits operate to compute neural network operations in an efficient, low-power manner, according to the configuration data provided by the control circuits.

In some embodiments, each of the cores has the same structure as all of the other cores, and is associated with its own separate portion of the unified memory. Specifically, the unified memory includes numerous memory banks (e.g., SRAMs) associated with each core. In some embodiments, each core has the same number of associated memory banks. Each of the cores has a direct port for accessing (i.e., reading from and writing to) its own memory banks, and is unable to access the memory banks associated with other cores.

The microprocessor and input processing circuit(s), on the other hand, have access to all of the memory banks of the unified memory. In some embodiments, the unified memory has two different interfaces: a first interface for the cores of the computation fabric to access their own respective memory banks and a second interface for the microprocessor and input processing circuit to access all of the memory banks. This second interface, in some embodiments, includes a crossbar circuit that enables various read/write access mechanisms from the microprocessor and input processing circuit to share the interface and access the various different blocks of unified memory banks.

In some embodiments, the microprocessor and input processing circuit use two different memory address spaces when reading from and writing to the unified memory. A first address space, referred to as a physical address space, is also used by the neural network computation fabric. This physical address space identifies each specific one of the physical memory banks based on (1) the core with which the specific memory bank is associated and (2) the number of the memory bank. In some embodiments, each core is associated with the same number of memory banks and each memory bank is the same size, so a single address based on the individual memory bank size and the core number can be used to uniquely identify a memory location in the first (physical) address space.

The microprocessor and input processing circuit use the physical address space when reading and writing data that is also shared with the neural network computation fabric. For instance, the input processing circuit writes input data to the unified memory using the physical address space, as this data will be used by the computation fabric to execute the network. Similarly, the microprocessor reads the network output values from the unified memory using the physical address space. The microprocessor may then perform processing operations on this output, possibly using the second address space to read/write any additional data during these processing operations.

A compiler that generates the configuration data for enabling the neural network computation fabric to execute a particular neural network determines, based on a specification of the neural network, which memory banks of which cores will be involved in the execution of each neural network layer. These memory banks are assigned for storing weights, intermediate activations, and/or network inputs. Different numbers of memory banks may be assigned from different cores for these purposes, depending on the nature of the neural network.

The second address space, referred to as a virtual address space, re-maps the physical memory banks that are not used by the neural network computation fabric to a single contiguous block of memory banks. For instance, for a circuit with four cores, if two memory banks are unused in each of three cores and a single memory bank is unused in the last core, then the virtual address space has a size of seven memory banks. This allows the microprocessor and input processing circuit to access these memory banks without regard to which core the banks are associated with.

When the IC is booted up, in some embodiments firmware of the IC programs the memory interface shared by the non-fabric circuits with a virtual address to physical address mapping table. This table enables virtual addresses from these circuits to be converted into the correct physical memory locations. In some embodiments, the physical addresses and virtual addresses use different prefixes. When the memory interface receives a read/write command with the physical address prefix, this prefix is simply removed and the underlying physical address (referring to a specific physical memory location) is used. When the memory interface receives a read/write command with the virtual address prefix, this prefix is removed and the underlying virtual address is converted into a physical address (referring to a specific physical memory location) using the mapping table.

In some embodiments, the unified memory structure enables the neural network computation fabric to execute the network for a first network input that was previously written to a first set of memory banks by the input processing circuit while (i) the input processing circuit writes a second network input to a second set of memory banks and/or (ii) the microprocessor reads (and performs post-processing on) a network output generated by the computation fabric for a third, prior network input.

The neural network instructions provided by the microprocessor, however, are unchanged whether the computation fabric is executing the network for (i) the first input written to the first set of memory banks or (ii) the second input written to the second set of memory banks. Because these instructions decode to read operations for specific physical memory locations for the input activations (among various other read, write, and computation operations), in some embodiments the firmware programs a logical address to physical address translation table in the computation fabric before each execution of the network for a new input. The instructions, therefore, are given as logical memory addresses, which the fabric converts to physical addresses before performing the read/write operations.

For the IC to execute a single network using this synchronous execution/I/O scheme, in some embodiments the compiler allocates the first set of memory banks for the input processing circuit to write the first input (and third input, fifth input, etc.) and the second set of memory banks for the input processing circuit to write the second input (and fourth input, sixth input, etc.). While the computation fabric executes the network for the first input, the first set of memory banks are allocated for storing the current input (which the fabric reads in at least the first layer of the network), and in some embodiments can be used as intermediate activation storage for subsequent layers once the input is no longer needed. During this execution, the input processing circuit writes the second input to the second set of memory banks. Once execution is complete, the firmware modifies the logical address to physical address translation table in the computation fabric so as to swap the logical addresses of the first and second sets of physical memory banks. Thus, while the computation fabric executes the network (using the same instructions) for the second input, the second set of memory banks are allocated for storing the current input.

In some embodiments, the IC can be configured to execute multiple networks (e.g., with the same input, different inputs from the same sensor, inputs from different sensors, etc.). For instance, an IC might execute two networks analyzing different images from different cameras, one network analyzing images and one network analyzing audio, etc. In this case, different options are available for efficiently executing the networks such that the inputs are written to the unified memory while the networks are executing.

In a first scheme, all of the networks execute simultaneously (e.g., in different sets of cores of the computation fabric) while the inputs are written to the unified memory. Described in terms of two networks, in this scheme the input processing circuit(s) alternate between writing inputs for the first network to first and second sets of memory banks and writing inputs for the second network to third and fourth sets of memory banks. The downside to this scheme is the extensive use of memory. If the combined inputs for all of the networks use a total of X memory banks, then 2X memory banks need to be allocated for this purpose. The upsides are (i) the simultaneous execution of the networks and (ii) the logical address to physical address translation table for each network execution can be determined by the compiler.

A second scheme, on the other hand, only executes one of the networks at a time but saves on memory consumption by the network inputs. In this scheme, enough memory banks are allocated for the input processing circuit(s) to write inputs for all of the networks simultaneously, but the number of memory banks allocated for the computation fabric to read a network input is only equal to the largest number of memory banks allocated for a single network input. In this scheme, responsibility for updating the logical address to physical address translation table is assigned to the firmware to perform at runtime. If the networks were to always cycle through in the same order, the compiler could determine the mapping table for each subsequent execution. However, in this scheme, one network might be executed twice in a row, so the firmware is responsible for determining which network is executed next and, therefore, which memory banks will be used for reading input and which memory banks will be used for writing the next inputs for each network.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 12 conceptually illustrates the changing of the logical to physical address mapping table for the unified memory of FIG. 11 over the course of several executions of a network for subsequent inputs.

FIG. 13 conceptually illustrates the changing of the logical to physical address mapping table for the memory banks of a unified memory over the course of several concurrent executions of two networks for subsequent inputs.

FIGS. 14A-B conceptually illustrate the changing of the logical to physical address mapping table for the memory banks of a unified memory over the course of several executions of two networks.

FIG. 18 conceptually illustrates a process of some embodiments for executing a set of instructions (or a portion of a set of instructions) to compute the output of a neural network node.

DETAILED DESCRIPTION

Some embodiments provide an integrated circuit (IC) for executing a machine-trained network (e.g., a neural network). The IC of some embodiments includes a set of input processing circuits that prepares input data for the neural network, a neural network computation fabric (also referred to as a neural network inference circuit or a neural network accelerator) that can be configured to apply a neural network to a set of input data, a microprocessor circuit (e.g., a CPU) that controls the input processing circuits and configures the neural network computation fabric according to neural network program instructions, and a unified memory that is accessible by the input processing circuits, neural network computation fabric, and microprocessor circuit. In some embodiments, the unified memory allows for a first neural network input to be written to a first set of memory banks (shared by the input processing circuits and the neural network computation fabric) while the neural network computation fabric executes the neural network for a different input that was written to a second set of memory banks.

Figure 1:
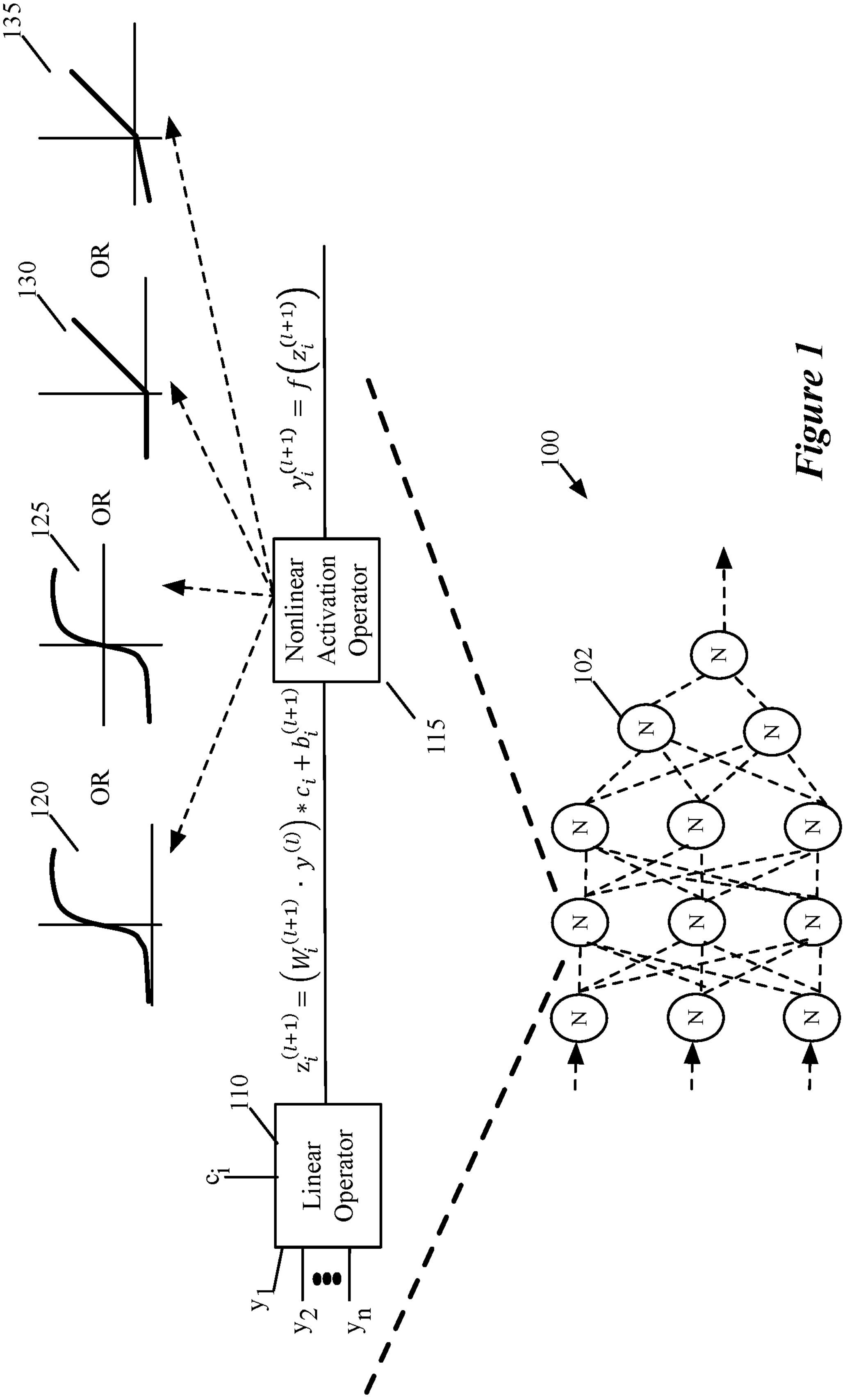
FIG. 1 illustrates an example of a multi-layer machine-trained network of some embodiments.

FIG. 1 illustrates an example of a multi-layer machine-trained network of some embodiments. This figure illustrates a feed-forward neural network 100 that has multiple layers of processing nodes 102 (also called neurons). In all but the first (input) and last (output) layer, each node 102 receives two or more outputs of nodes from earlier processing node layers and provides its output to one or more nodes in subsequent layers. The output of the node (or nodes) in the last layer represents the output of the network 100. In different embodiments, the output of the network 100 is a number in a range of values (e.g., 0 to 1), a vector representing a point in an N-dimensional space (e.g., a 128-dimensional vector), or a value representing one of a predefined set of categories (e.g., for a network that classifies each input into one of eight possible outputs, the output could be a three-bit value).

In this example, the neural network 100 only has one output node. Other neural networks of other embodiments have several output nodes that provide more than one output value. Furthermore, while the network 100 includes only a few nodes 102 per layer, a typical neural network may include a varying number of nodes per layer (with some layers having several thousand nodes) and significantly more layers than shown (e.g., several dozen layers). In addition, the neural networks of other embodiments may be types of networks other than feed forward networks (e.g., recurrent networks, regulatory feedback networks, radial basis function networks, etc.).

The illustrated network 100 is a fully-connected network in which each node in a particular layer receives as inputs all of the outputs from the previous layer. However, as mentioned, the neural networks of some embodiments are convolutional feed-forward neural networks. In this case, the intermediate layers (referred to as "hidden" layers) may include convolutional layers, pooling layers, element-wise operation layers, fully-connected layers, and/or normalization layers. The convolutional layers of some embodiments use a small kernel (e.g., 2×2, 3×3, 5×5, etc.) to process blocks of input values (output values from a previous layer) in a set of two-dimensional grids (e.g., channels of pixels of an image, input feature maps) with the same set of parameters. The kernels (also referred to as filters) are three-dimensional, and multiple kernels are used to process each group of input values in a layer (resulting in a set of three-dimensional output grids, also referred to as output feature maps). Pooling layers combine clusters of outputs from one layer into a single node at the next layer, as part of the process of reducing an image (which may have a large number of pixels) or other input item down to a smaller size (e.g., a vector output). In some embodiments, pooling layers can use max pooling (in which the maximum value among the clusters of node outputs is selected) or average pooling (in which the clusters of node outputs are averaged).

Figure 2:
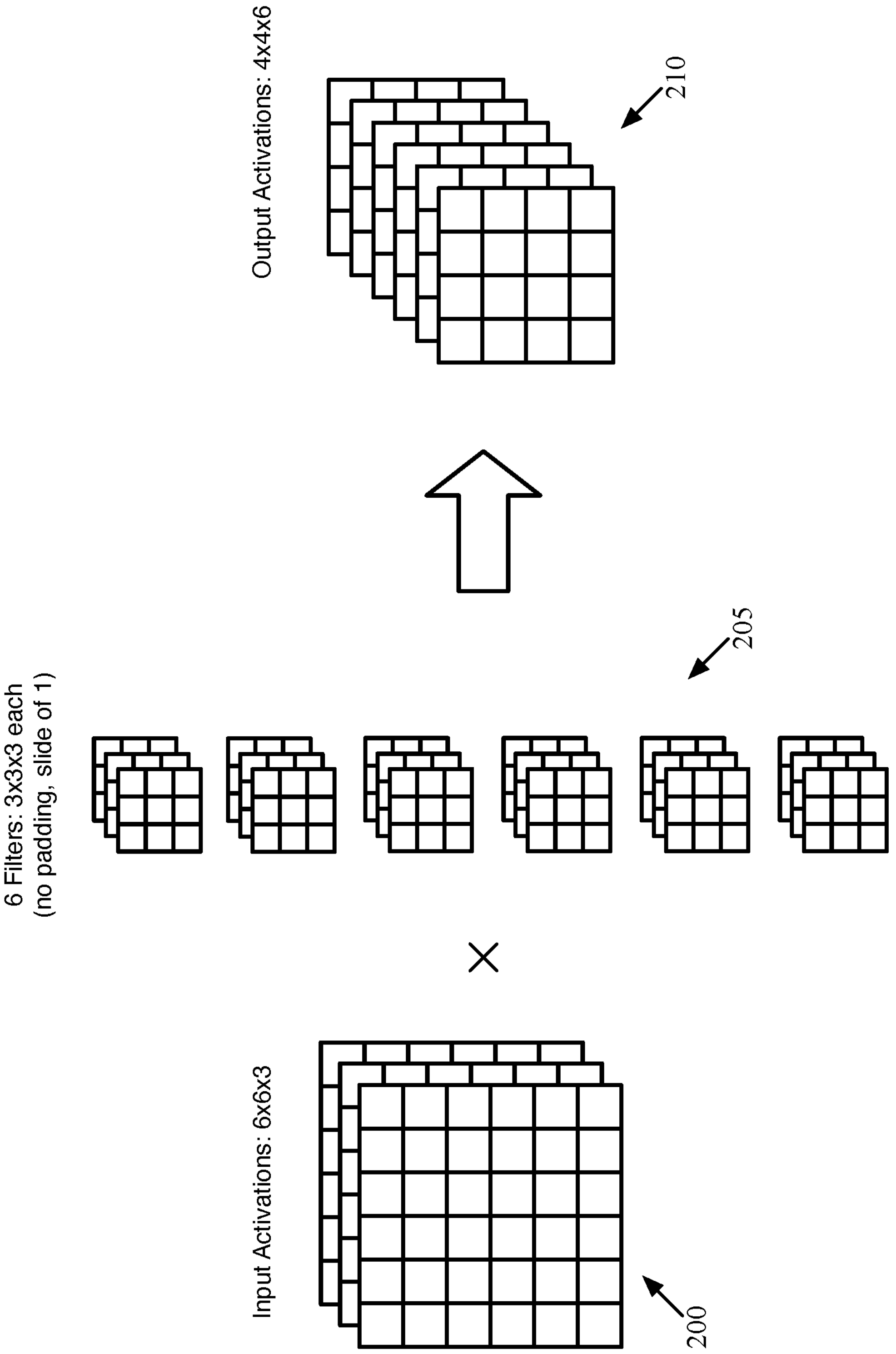
FIG. 2 conceptually illustrates a representation of a convolutional layer of a convolutional neural network.

FIG. 2 conceptually illustrates a representation of a convolutional layer of a convolutional neural network. The convolutional layer receives a set of input activation values 200 organized as a three-dimensional array. This three-dimensional array is typically either (i) a set of input values for the network, if the convolutional layer is the first layer of the network, or (ii) a set of output values of a previous layer of the network (e.g., a previous convolutional layer, a pooling layer, etc.). The array can be conceptualized as a set of two-dimensional grids, also referred to as input feature maps or input channels for the layer, as shown in the figure. In this example, the dimensions of the input values are 6×6×3 (i.e., three 6×6 input channels).

Each computation node of the convolutional layer involves a linear component (e.g., a dot product followed by scaling and bias functions) as well as a non-linear component, as further described below. The input to each computation node is a subset of the input activation values, and the dot product for the computation node involves multiplying those input activation values by the weights that make up one of the filters of the layer. As shown, in this example the layer includes six filters 205, each of which is 3×3×3. Each value in one of the filters is a weight value that is trained using the techniques described herein. Thus, in the example shown in this figure, each filter includes 27 trainable weight values.

The size of the filters in the x and y directions can vary (3×3 and 5×5 are common sizes), but in some embodiments the depth is required to match the depth of the input activations (in this case there are three input channels, so the depth is three). The number of filters in a given layer can also vary—as a general concept, each filter is attempting to identify the presence or extent of a particular feature in the input feature maps. For instance, in image analysis, a filter in an early layer might test for the presence of an edge in a particular direction while a filter in a later layer tests for the presence of a more specific object type in the image (e.g., a nose).

To generate the output activations, each of the filters 205 is applied to numerous subsets of the input activation values 200. Specifically, in a typical convolution layer, each 3×3×3 filter is moved across the three-dimensional array of activation values, and the dot product between the 27 activations in the current subset and the 27 weight values in the filter is computed. This process starts in the top left corner (e.g., x=0-2, y=0-2) of the grid, and includes the full depth of the array. The filter moves across the rows, in this case using a slide of 1 (i.e., moving one column per computation node, such that the second dot product uses activations at x=1-3, y=0-2). When the end of a row is reached, the filter is moved back to the first columns (i.e., x=0-2) and down one row (i.e., y=1-3), and so on until the bottom right corner of the array is reached. Though not the case in this example, some embodiments use zero-padding at the edges of the grids (e.g., to allow for better detection of features at the edges of images).

The output activation values 210 are arranged in a 4×4×6 array in this example. The outputs from a single filter are arranged in a single grid (also referred to as an output feature map or output channel), and because the example has six filters 205, the output activations have six output feature maps. Using a slide value of 1 with no zero-padding results in a 4×4 output feature map for each filter. These output activation values 210 are then the input activation values for the next layer of the neural network.

As shown in FIG. 1, each node in the neural network 100 has a linear component 110 and a nonlinear component 115. The linear component 110 of each hidden or output node in this example computes a dot product of a vector of weight coefficients and a vector of output values of prior nodes (i.e., as described above for convolutional layers), multiplies this by a scaling value (which may be set to 1), and adds an offset. In other words, in a convolutional or fully-connected layer, a node's linear operator computes a scaled weighted sum of its inputs (which are outputs of the previous layer of nodes) plus an offset (also referred to as a bias). Similarly, the linear component 110 of each input node of some embodiments computes a dot product of a vector of weight coefficients and a vector of input values, scales this dot product, and adds an offset. In other embodiments, each input node receives a single input and passes that input as its output. Each node's nonlinear component 115 computes a function based on the output of the node's linear component 110. This function is commonly referred to as the activation function, and the outputs of the node (which are then used as inputs to the next layer of nodes) are referred to as activations.

The notation of FIG. 1 can be described as follows. Consider a neural network with L hidden layers (i.e., L layers that are not the input layer or the output layer). The variable l can be any of the hidden layers (i.e., $l \in \{1, \ldots, L-1\}$ index the hidden layers of the network, with l=0 representing the input layer and l=L representing the output layer). The variable $$z_i^{(l+1)}$$

represents the output of the linear component 110 of a hidden node i in layer l+1. As indicated by the following Equation (1), the variable $$z_i^{(l+1)}$$

is computed as the dot product of a vector of weight values $$W_i^{(l+1)}$$

and a vector or outputs $y^{(l)}$ from layer l multiplied by a scaling value $c_i$, and offset by a bias value $b_i$:

$$z_i^{(l+1)} = \left(W_i^{(l+1)} \cdot y^{(l)}\right) * c_i + b_i^{(l+1)} = \sum_{k=1}^{n} \left(w_{ik}^{(l+1)} * y_k^{(l)}\right) * c_i + b_i^{(l+1)}. \quad \text{(A)}$$

The scaling value $c_j$ is a value to which all the weight values for the node are normalized. In some embodiments, the scaling value $c_i$ is 1. The symbol * is an element-wise product, while the symbol · is the dot product. The weight coefficients $W^{(l)}$ are parameters that are adjusted during the network's training in order to configure the network to solve a particular problem (e.g., object or face recognition in images, voice analysis in audio, depth analysis in images, etc.). In some embodiments, the training algorithm imposes certain constraints on the weight values. Specifically, some embodiments impose a ternary constraint that requires all of the weight values for any given layer to be either zero, a positive value, or a negation of the positive value (e.g., 0, 1, and −1). In addition, some embodiments require that at least a threshold percentage of the weight values (for a given layer or for the entire network) are equal to zero (e.g., 75%, 80%, etc.).

The output $$y_i^{(l+1)}$$

of the nonlinear component 115 of a node in layer l+1 is a function of the node's linear component, and can be expressed as by Equation (B) below:

$$y_i^{(l+1)} = f\left(z_i^{(l+1)}\right). \quad \text{(B)}$$

In this equation, $f$ is the nonlinear activation function for node i. Examples of such activation functions include a sigmoid function 120 ($f(x)=1/(1+e^{-x})$), a tanh function 125, a ReLU (rectified linear unit) function 130 or a leaky ReLU function 135, as shown.

Traditionally, the sigmoid function and the tanh function have been the activation functions of choice. More recently, the ReLU function ($f(x)=\max(0, x)$) has been proposed for the activation function in order to make it easier to compute the activation function. See Nair, Vinod and Hinton, Geoffrey E., "Rectified linear units improve restricted Boltzmann machines," ICML, pp. 807-814, 2010. Even more recently, the leaky ReLU has been proposed in order to simplify the training of the processing nodes by replacing the flat section (i.e., x<0) of the ReLU function with a section that has a slight slope. See He, Kaiming, Zhang, Xiangyu, Ren, Shaoqing, and Sun, Jian, "Delving deep into rectifiers: Surpassing human-level performance on imagenet classification," arXiv preprint arXiv:1502.01852, 2015. In some embodiments, the activation functions can be other types of functions, like cup functions, periodic functions, piecewise linear functions, etc.

Equation (B) can be expressed in the following expanded format of Equation (C):

$$y_i^{(l+1)} = f\left(z_i^{(l+1)}\right) = f\left[\left(\sum_{k=1}^{n} w_{ik} * y_k\right) * c_i + b_i^{(l+1)}\right]. \quad \text{(C)}$$

In this equation, $w_{ik}$ are weight values associated with the inputs $y_k$ of the node i in layer l+1.

Before a multi-layer network (e.g., a convolutional neural network) can be used to solve a particular problem, the network is put through a supervised training process that adjusts the network's configurable parameters (e.g., the weight values, biases, etc.). The training process iteratively selects different input value sets with known output value sets. For each selected input value set, the training process typically (1) forward propagates the input value set through the network's nodes to produce a computed output value set and then (2) backpropagates a gradient (rate of change) of a loss function (output error) that quantifies in a particular way the difference between the input set's known output value set and the input set's computed output value set, in order to adjust the network's configurable parameters (e.g., the weight values). In addition, some embodiments quantize the network (constraining the weight values to sets of allowed values and/or accounting for quantization of output values to a certain number of bits) and use various techniques, such as the alternating direction method of multipliers (ADMM), to train the quantized weight values (which includes performing additional forward and backward propagation) and ensure that at least a threshold percentage of the weight values are set to zero.

In some embodiments, the weight values and/or activation values within the network are quantized for use on a particular device. Specifically, some embodiments quantize activation values to a particular number of bits (e.g., 4 bits) during the execution of the network. For weight values, some embodiments use binary or ternary weight values. Binary weight values are typically trained such that each weight is either 0 or 1, and ternary weight values are typically trained such that each weight value is one of the set {0, 1, −1}. In either case, the weight values may be multiplied by a scale value determined for a layer or channel. To save memory, some embodiments train the networks to be extremely sparse, with a large majority (e.g., 85%, 90%) of the weights set to 0 (rather than 1 or −1). In some such embodiments, the weights are stored on the device (e.g., in the memory of a neural network inference circuit embedded in the device) in an encoded manner such that zero-value weights require less memory than non-zero weights. These networks can still be very predictive, but at the margins decreasing sparsity (e.g., from 90% to 85%) improves prediction accuracy.

Such a neural network inference circuit is part of an integrated circuit (IC) in some embodiments. The ICs of some embodiments are configurable to implement different networks trained to perform a particular function, and such networks may include replicated layers (trained with quantization). For instance, the ICs may implement networks for object or facial recognition in images, voice recognition in audio samples, etc. The IC of some embodiments includes a set of input processing circuits, a neural network computation fabric that can be configured to apply a neural network to an input, a microprocessor (e.g., for controlling the input processing circuits and configuring the neural network computation fabric), and a unified memory that is accessible by all of these circuits.

Figure 3:
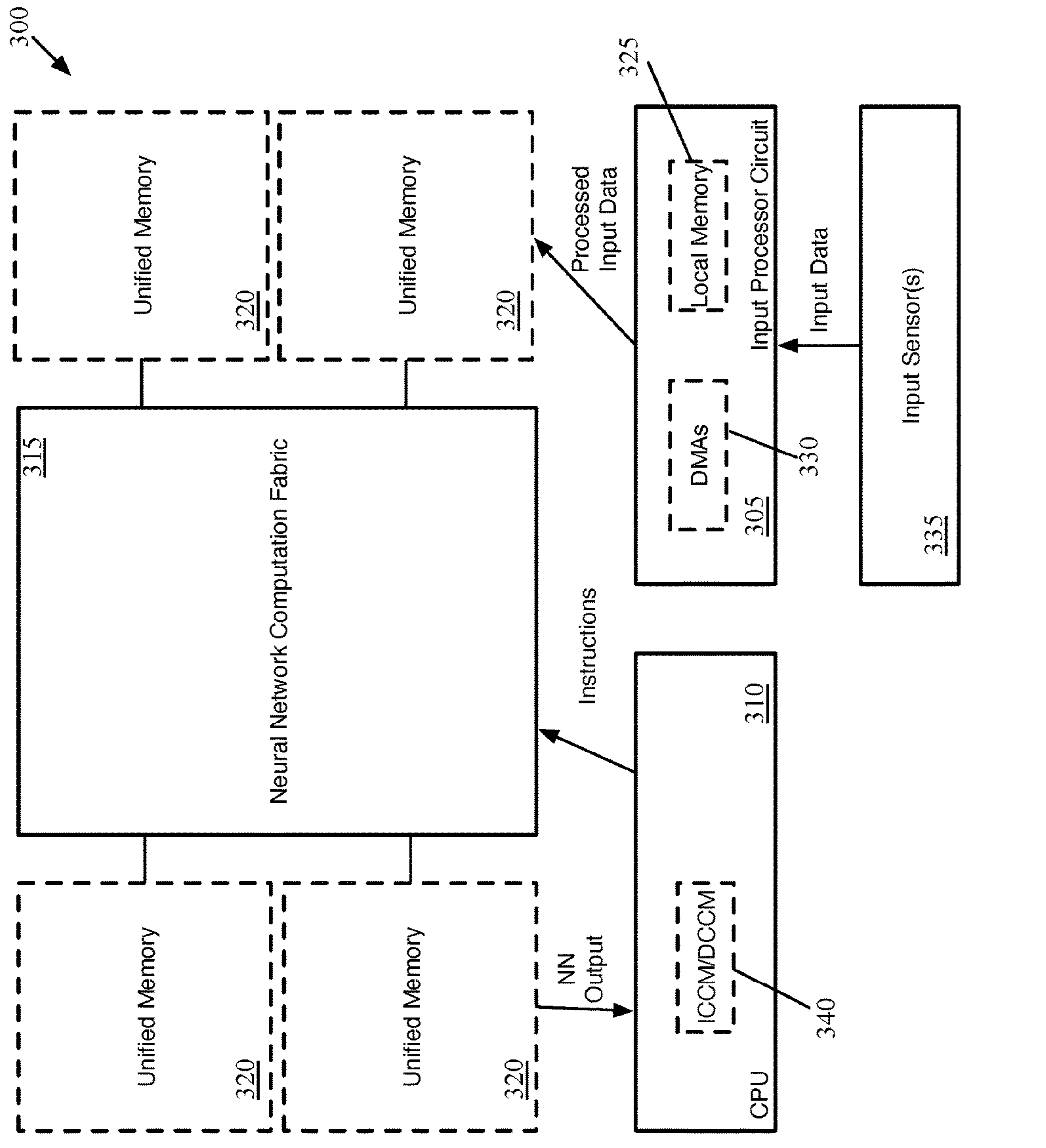
FIG. 3 conceptually illustrates an integrated circuit of some embodiments.

FIG. 3 conceptually illustrates such an IC 300 of some embodiments. As shown, the IC includes an input processor circuit 305, a microprocessor (CPU) 310, a neural network computation fabric 315, and a set of unified memory 320. In addition, the input processor circuit 305 includes local memories 325 (e.g., a small amount of memory for input processing instructions) and direct memory accesses 330 (which enable the input processing circuit 305 to access the unified memory 320 without CPU involvement). The CPU 310 includes closely coupled memory 340 for instruction (ICCM) and data (DCCM) which can be used for booting up the IC (e.g., boot loaders and/or firmware are loaded out of ROM (not shown) into the ICCM and/or DCCM), as well as typical components for accessing the unified memory.

The unified memory 320, as mentioned, is shared by the CPU 310, the input processor circuit 305, and the neural network computation fabric 315. This unified memory 320 is shown in four blocks in this figure; as described below, in some embodiments the neural network computation fabric includes multiple cores that each access their own respective portions of the unified memory. In some embodiments, the unified memory 320 is made up of banks of SRAMs. In addition, the unified memory includes multiple interfaces for the different circuits 305-315 to access the memory for read/write operations. In some embodiments, the unified memory includes direct access ports for the cores of the computation fabric 315 to access their associated memory banks, as well as a separate interface for enabling the CPU 310 and input processor circuit 305 to access all of the memory banks.

In some embodiments, the IC is integrated into a device (such as an Internet of Things (IOT) device) with one or more input sensors 335. These input sensors can include cameras (e.g., for capturing video images on which the neural network computation fabric 315 performs face or object recognition, etc.), microphones (e.g., for capturing audio on which the neural network computation fabric 315 performs voice recognition, speech processing, etc.), or other types of input sensors. In other embodiments, the input sensors 335 are located on a separate device that is linked with the IC 300.

In some embodiments, at bootup of the IC 300, the firmware loads a neural network program object. This causes the CPU 310 to load neural network configuration data (e.g., weight values, scale and bias parameters, lookup table masks for each layer, memory locations for the weight and input values to use for computing each layer of the network, etc.) from off-chip storage and to store weight values and instruction arguments to the unified memory 320. In different embodiments, the weight values and/or instruction arguments may be stored in the unified memory 320 by the CPU 310 directly or by the CPU 310 generating instructions for the neural network computation fabric 315 to write this data (the weight values and/or instruction arguments) to the unified memory 320. Some embodiments, rather than storing instruction arguments in the unified memory 320, instead use a specific memory local to the computation fabric 315 to store instruction arguments. However, the benefit of using the unified memory 320 for this purpose is that doing so allows for larger networks (e.g., with more layers that would require more instruction arguments).

In addition, the CPU 310 loads the neural network program instructions for the computation fabric to its own memory 325. These instructions are applied by the computation fabric 315 to input data in order to execute the neural network. These runtime instructions include, e.g., indications as to which pre-loaded sets of instruction arguments to use for each set of calculations, etc.

The input processor circuit 305 receives input data (e.g., still images or video frames, sounds, etc.) from the input sensor(s) 335, and processes these according to processing instructions received from the CPU 310 or stored in local memory 325. These instructions identify, in some embodiments, any sort of initial processing to apply to the raw data (e.g., decompression of compressed data, etc.), if any, as well as how to store the input data in the unified memory 320 to be read by the computation fabric 315. Because the input processor circuit 305 and the computation fabric 315 share the unified memory 320, the input data does not need to be copied from one circuit's local memory to another. Instead, the input processor circuit 305 stores an input once into the unified memory 320 and the computation fabric 315 reads the input from the same location in the unified memory 320. For an image, e.g., the storage instructions might specify the specific location that pixel values (e.g., RGB values) should be arranged and stored in the unified memory 320. The input processor circuit 305 also sends signals to the CPU 310 to indicate when it has fully buffered an input (e.g., a frame of video) so that the input can be read by the computation fabric 315.

In addition to instructing the input processor circuit 305 how and when to store input data for use by the computation fabric 315, the CPU 310 provides the neural network program instructions to the computation fabric. In some embodiments the CPU 310 provides these instructions in stages (e.g., one layer or portion of a layer at a time). Once the final output of the neural network is computed, the fabric 315 stores this output in the unified memory 320, so that the CPU (or other circuitry on the device) can perform post-processing operations on the output (e.g., evaluate the output and perform any actions based on the output).

Before describing the unified memory in more detail, the computation fabric of some embodiments will be described. The computation fabric provides a set of circuits for performing the various computations required for neural networks (e.g., dot product computations, scaler and bias operations, activation functions, etc.), with the network parameters (weight values, bias values, node arrangement, filter size, etc.) configurable. In some embodiments, the computation fabric imposes certain requirements on the networks, such as a maximum size of the network (i.e., a maximum size of the dot product computations), that the weight values be ternary (e.g., 0, $\alpha$, and $-\alpha$ for each layer of the network), and/or that at least a particular percentage of the weight values be equal to zero.

Figure 4:
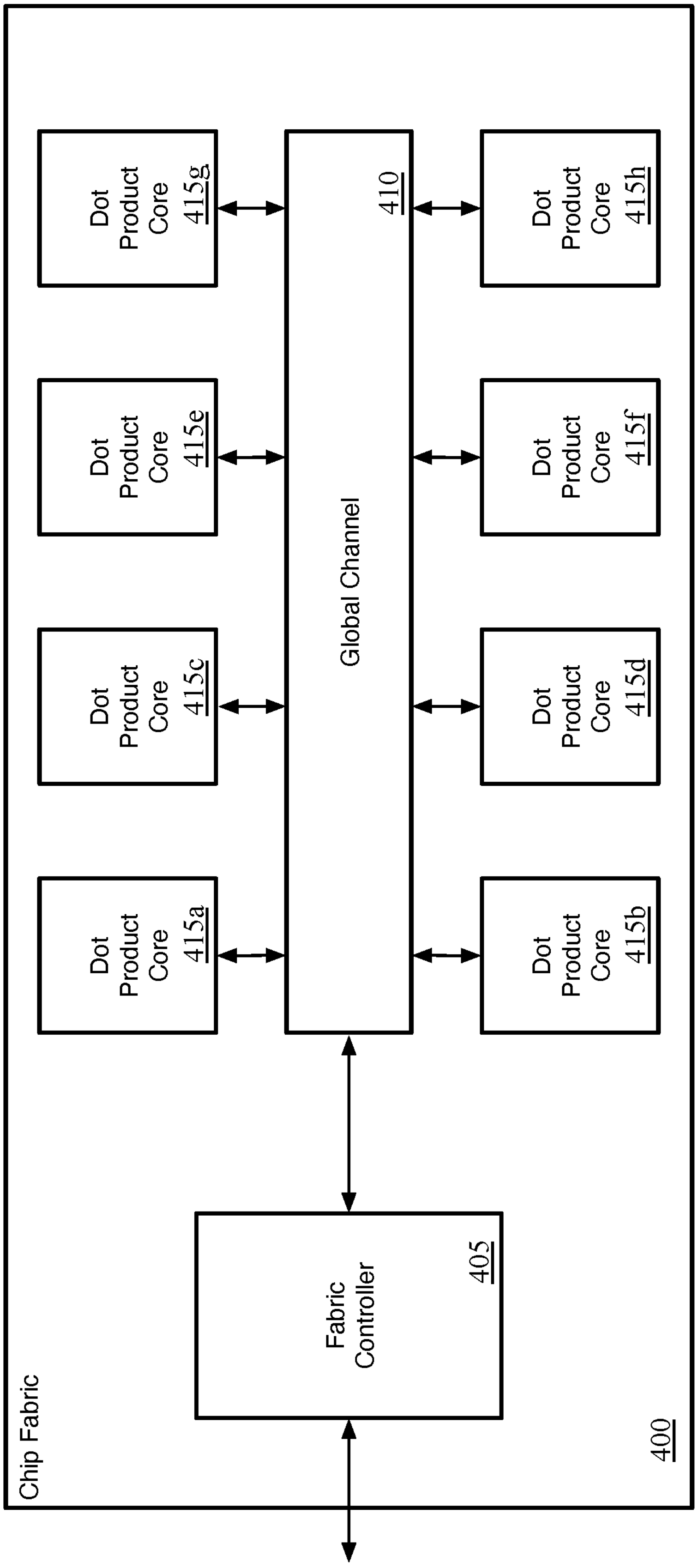
FIG. 4 conceptually illustrates the neural network computation fabric of some embodiments.

FIG. 4 conceptually illustrates the neural network computation fabric 400 (also referred to as the neural network inference circuit, chip fabric, or neural network accelerator) of some embodiments. The chip fabric 400 of some embodiments includes a fabric controller 405, a global channel 410, and a set of dot product cores 415*a-h*. The connections between the various components 405-415 represent the flow of both control data (e.g., configuration data for a particular neural network layer) and computation data at runtime in some embodiments.

The fabric controller 405 is responsible for managing the operation of the rest of the chip fabric 400 (e.g., the dot product cores 415) in some embodiments. The fabric controller 405 loads instruction arguments (e.g., weight and activation value locations, which cores to use for a particular computation, etc.) from the unified memory (or a local memory on the chip) based on instructions received from the CPU, maps instructions into a sequence of memory-mapped register writes, synchronizes the downstream controllers (e.g., controllers for the various cores 415), etc. The instructions managed by the fabric controller 405 are configured at compile time, in some embodiments, based on the parameters of the network being implemented by the chip fabric 400. In some embodiments, the fabric controller 405 interacts with the microprocessor of the IC as well (i.e., the fabric controller 405 handles the communication with the CPU 310 shown in FIG. 3). During execution of the neural network in some embodiments, the fabric controller 405 receives instructions as opcodes along with pointers to the location in the unified memory (or local memory) of the arguments for that opcode. The fabric controller retrieves these arguments in order to determine the full instruction. Because some instructions can have dozens of arguments and the same instructions are sent each time the network is executed for a new input (e.g., many times per second), storing the arguments locally (rather than the CPU sending the arguments with each instruction) saves processing power and system bus bandwidth.

The chip fabric also includes numerous dot product cores 415 as well as a global channel 410 that connects the cores, with these data processing circuits configured by the fabric controller (and a set of hierarchical control circuits, in some embodiments). These data processing circuits 410 and 415 operate to compute neural network operations in an efficient, low-power manner, according to the configuration data provided by the control circuits.

The dot product cores 415*a-h* include circuitry for computing partial dot products in some embodiments, which is described in further details below. In some embodiments, this circuitry includes memory and/or buffers for storing weights and activations, controllers for reading these values out of memory, and adder trees for computing the partial dot products based on the weight and activation inputs. The core memory, controllers, adder trees, and other core circuitry of some embodiments are described below in greater detail.

The global channel 410 is responsible for providing a communications bus for control and computation data between the fabric controller 405 and the cores 415, as well as from one core to another. The global channel 410, among other operations, accumulates partial dot products from multiple cores when computing dot products that require more computations than can be performed in a single core, and performs post-processing on these dot products. In addition, the global channel 410 carries activations (i.e., computation node outputs) after post-processing for storage (and for use as inputs to subsequent computation nodes) in other cores 415. In some embodiments, the global channel 410 includes an accumulating bus for accumulating the dot products and a non-computation bus for providing activations, weights, and other configuration data to the cores and other computation circuits. In some embodiments, the linear function post-processing and non-linear function for each neural network node are also performed by circuits in the global channel 410, as described further below.

The chip fabric 400 of some embodiments computes numerous neural network computation nodes simultaneously, with the computation for one node often spread across multiple cores (and subsequently the global channel). In some cases, if a neural network layer is small enough, then computation for that layer may be confined to a single core 415. However, if multiple cores are used for a given layer (any number of cores may be used in some embodiments), then each dot product computed for that layer is spread across all of the cores 415 in use.

That is, for a dot product computed across more than one core 415, each of these cores computes a partial dot product from a subset of the input values and weight values for the node, then provides these partial dot products to the global channel 410. In some embodiments, a set of input values are used as the input to multiple nodes in a layer, so a core simultaneously computes the dot products of these input values with multiple sets of weight values. Similarly, a set of weight values (referred to as a filter, or filter slice when that filter is divided across multiple cores) are used as the weights for numerous nodes with different sets of input values, so in some embodiments the cores load sets of weight values once and then compute dot products of these weight values with numerous different sets of input values.

In the simplest case, all of the partial dot products are computed in the same clock cycle and provided at the same time to the global channel 410. In some cases, however (e.g., for dot products with a very large number of terms or using larger than standard activation values, or when filters have too many nonzero weight values), each core 415 computes more than one partial dot product for a single computation node, requiring multiple clock cycles (also referred to as time-multiplexing of the dot products). Based on configuration data specifying which outputs from the cores are to be added together (and whether multiple partial dot products are required from the same core), the global channel 410 aggregates these partial dot products to compute the complete dot product for each node, then applies various post-processing functions (e.g., the bias, scale, and non-linear activation functions) to compute the output of each node.

Figure 5:
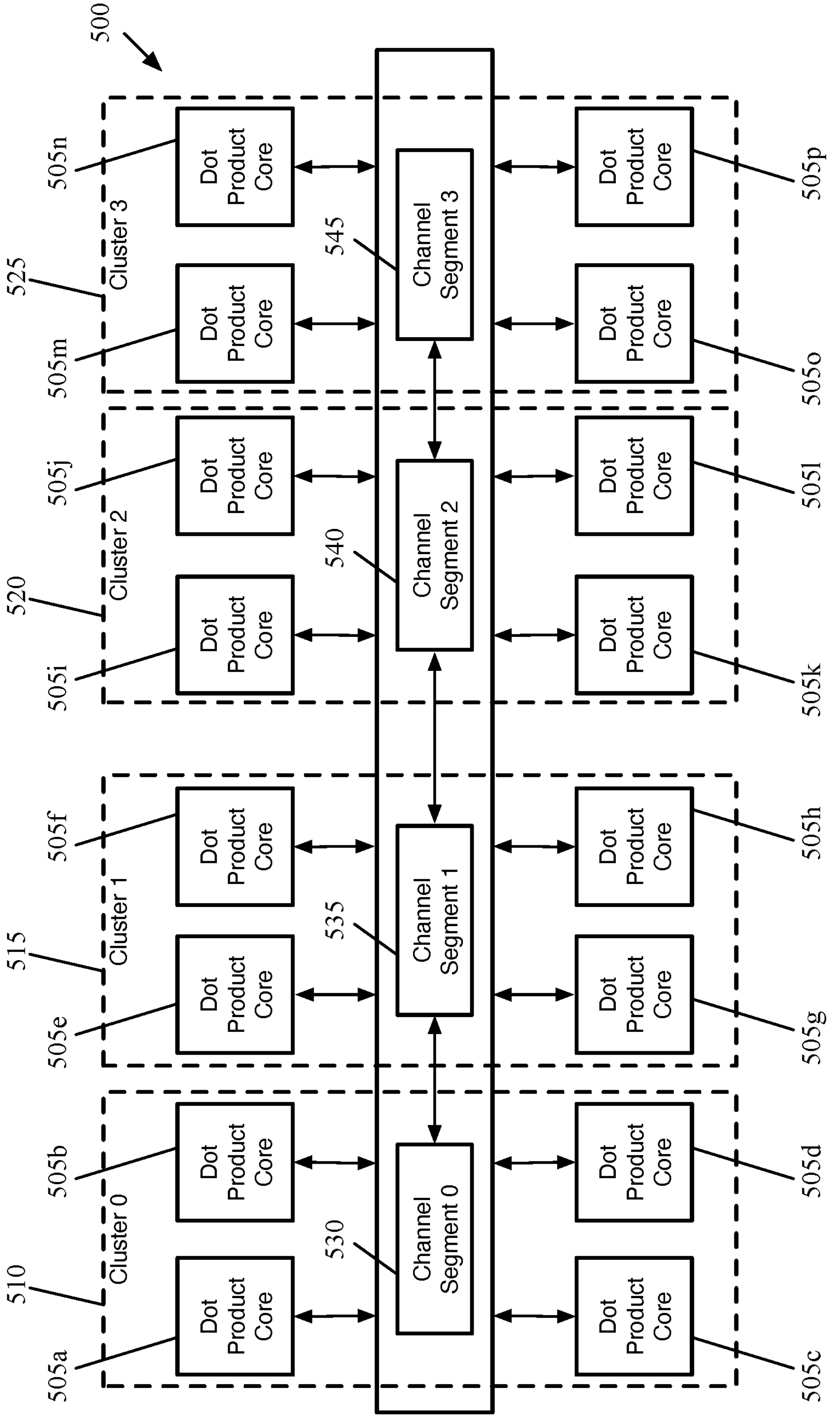
FIG. 5 illustrates a neural network computation fabric of some embodiments with sixteen dot product cores grouped into four clusters.

In some embodiments, the dot product cores are grouped into clusters, and the global channel includes separate segments for each such cluster. FIG. 5 illustrates a neural network computation fabric 500 of some embodiments with sixteen dot product cores 505*a-p* grouped into four clusters 510-525. In addition, the global channel includes four channel segments 530-545. Each of these channel segments includes the same circuitry in some embodiments, with the exception that buses in the first channel segment 530 and last channel segments 545 only connect to corresponding buses in one other channel segment while the buses in the intermediate channel segments 535 and 540 connect to corresponding buses in two neighboring channel segments.

The data processing circuitry of each of the channel segments 530-545 includes a dot product bus, a set of post-processing circuits, and an output bus in some embodiments. The dot product bus receives partial dot products from the cores, aggregates these dot products together, and provides the aggregated dot products to the post-processing circuits. The post-processing circuits perform the non-dot product computations of the neural network computation nodes, which may include a bias (addition) factor, a scaling (multiplication) factor, and a non-linear activation function (e.g., for a node in a convolutional or fully-connected layer). The output of the post-processing circuits are the computation node outputs (activations). The output bus, or activation write bus, carries the outputs of the post-processing circuits to the cores 505*a-p* to be stored as inputs for the next computation layer.

In some embodiments, each cluster 510-525 or group of clusters (e.g., clusters 510 and 515 being one group and clusters 520 and 525 being a second group) can execute a separate neural network. This allows the fabric to execute multiple networks simultaneously in some embodiments. For instance, a single chip of an IOT device could run both a facial recognition network and an object recognition network, a facial recognition network and a language parsing network, etc.

As noted above, the unified memory, in some embodiments, is not a single block of memory banks. Rather, the unified memory includes numerous memory banks (e.g., SRAMs) associated with each core. In some embodiments, each core has the same number of associated memory banks. Each of the cores has a direct port for accessing (i.e., reading from and writing to) its own memory banks, and is unable to access the memory banks associated with other cores. The microprocessor and input processing circuit(s), on the other hand, have access to all of the memory banks of the unified memory.

Figure 6:
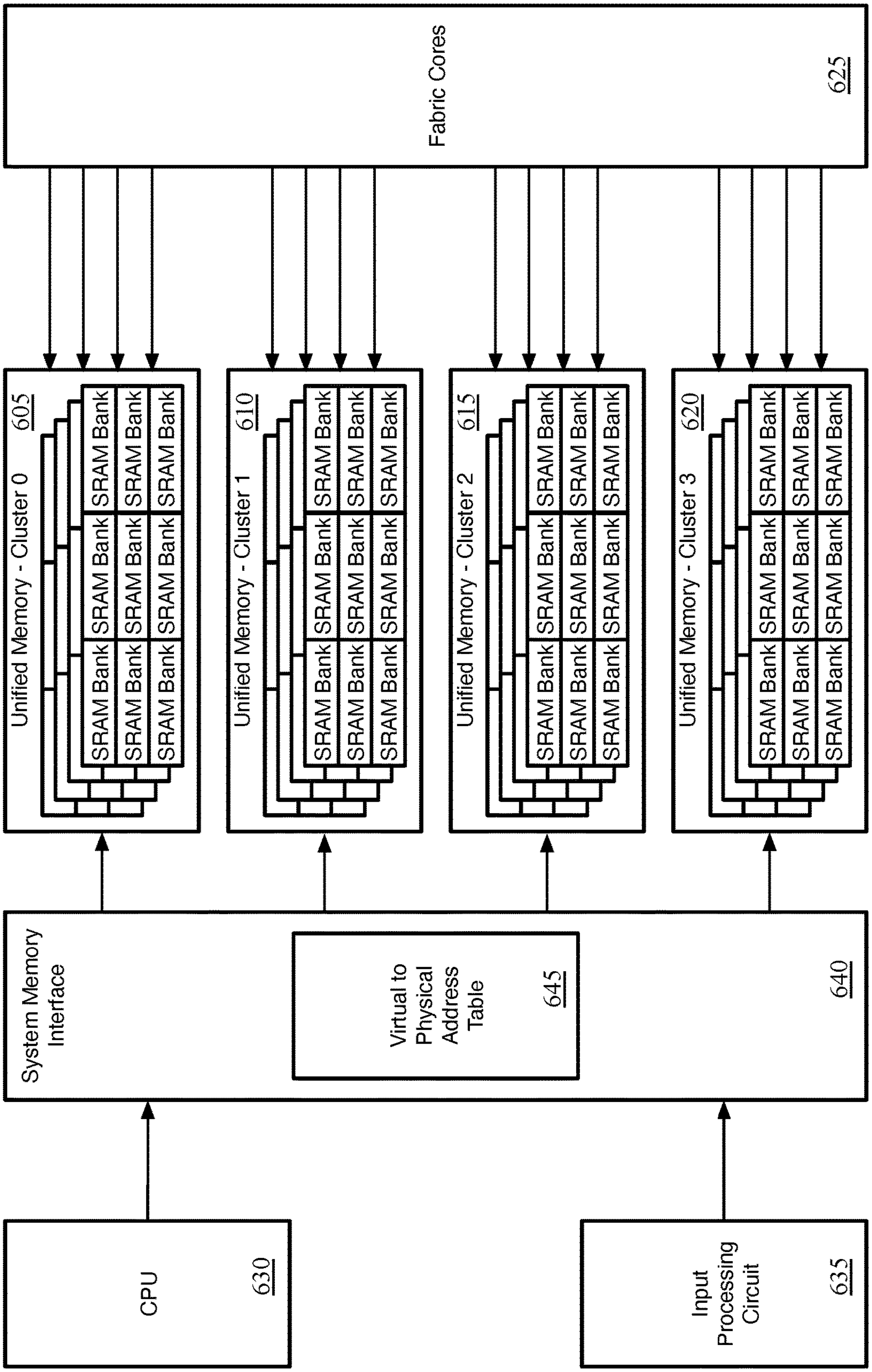
FIG. 6 conceptually illustrates the unified memory of some embodiments and how that memory is accessed by the cores of the computation fabric, the CPU, and the input processing circuit of the IC.

FIG. 6 conceptually illustrates the unified memory of some embodiments and how that memory is accessed by the cores of the computation fabric, the CPU, and the input processing circuit of the IC. As shown, the unified memory is divided into four clusters 605-620 of memory banks. In some embodiments, these clusters 605-620 of memory banks are physically located proximate to their respective clusters of the computation fabric. Within each cluster 605-620, the same number of memory banks are allocated to each of the cores. In this example, there are 9 memory banks per core for illustration purposes, but some embodiments use a power-of-2 (e.g., 8, 16, etc.) number of memory banks per core.

In some embodiments, the unified memory 605-620 has two different interfaces. As shown in the figure by the 16 arrows, each of the cores 625 of the computation fabric has a direct port for accessing its own memory banks (and none of the other memory banks) when reading data from and writing data to the unified memory (e.g., reading weight data, reading input and intermediate activations, writing intermediate activations, writing network outputs).

The CPU 630 and input processing circuit 635, on the other hand, both access the unified memory via a second system memory interface 640. This system memory interface, in some embodiments, includes a crossbar circuit that enables various read/write access mechanisms from the CPU 630 and input processing circuit 635 to share the interface and access the various different clusters 605-620 of unified memory banks. That is, while each of the fabric cores can only access their own memory (except via a bus for enabling certain activation movement between cores, in some embodiments), the CPU 630 and input processing circuit 635 can access any of the unified memory banks via the system memory interface 640.

The system memory interface 640 also includes a virtual address to physical address mapping table 645. In some embodiments, the CPU 630 and input processing circuit 635 use two different memory address spaces when reading from and writing to the unified memory. A first address space, referred to as a physical address space, is also used by the computation fabric cores 625. In some embodiments, this physical address space identifies each specific one of the physical memory banks based on (1) the core with which the specific memory bank is associated and (2) the number of the memory bank. In some embodiments, each core is associated with the same number of memory banks and each memory bank is the same size, so a single address based on the individual memory bank size and the core number can be used to uniquely identify a memory location in the first (physical) address space. In other embodiments, the physical addresses are not strictly based on the number of the memory banks within the core. Rather, the physical address for the first SRAM for a particular core is based on the number of the particular core and the total amount of memory per core, with the addresses for subsequent memory banks in the core assigned consecutively.

The CPU 630 and input processing circuit 635 use the physical address space when reading and writing data that is also shared with the computation fabric cores 625. For instance, the input processing circuit 635 writes input data to the unified memory using the physical address space, as this data will be used by the computation fabric to execute the network. Similarly, the CPU 630 reads the network output values from the unified memory using the physical address space. The CPU 630 may then perform processing operations on this output, possibly using the second address space to read/write any additional data during these processing operations.

The second address space, referred to as a virtual address space, re-maps the physical memory banks that are not used by the computation fabric cores 625 to a single contiguous block of memory banks. For instance, for a circuit with four cores, if two memory banks are unused in each of three cores and a single memory bank is unused in the last core, then the virtual address space has a size of seven memory banks. This allows the CPU 630 and input processing circuit 635 to access these memory banks without regard to which core the banks are associated with.

However, virtual addresses used by the CPU 630 and the input processing circuit 635 do not correspond to specific physical memory banks. As such, the system memory interface 640 includes a virtual address to physical address mapping table 645 to map virtual addresses to physical addresses in order to execute the read/write commands from the CPU 630 and input processing circuit 635. In some embodiments, the firmware of the IC programs the virtual to physical address mapping table 645 in the system memory interface 640 when the IC is booted up.

To differentiate the two types of addresses in some embodiments, the CPU 630 and input processing circuit 635 use different prefixes for physical addresses and virtual addresses. When the memory interface 640 receives a read/write command with the physical address prefix, this prefix is simply removed and the underlying physical address (referring to a specific physical memory location) is used. When the memory interface 640 receives a read/write command with the virtual address prefix, this prefix is removed and the underlying virtual address is converted into a physical address (referring to a specific physical memory location) using the mapping table.

In some embodiments, a compiler program generates the configuration data for the IC that enables the neural network computation fabric to execute a particular neural network for a particular function. This compiler receives a specification of the network and determines which memory banks of which cores will be involved in the execution of each network layer. Based on the assignment of core memories to the various neural network data (weights, input data, intermediate activations), the compiler determines the virtual to physical address mapping table that is used by the system memory interface.

Figure 7:
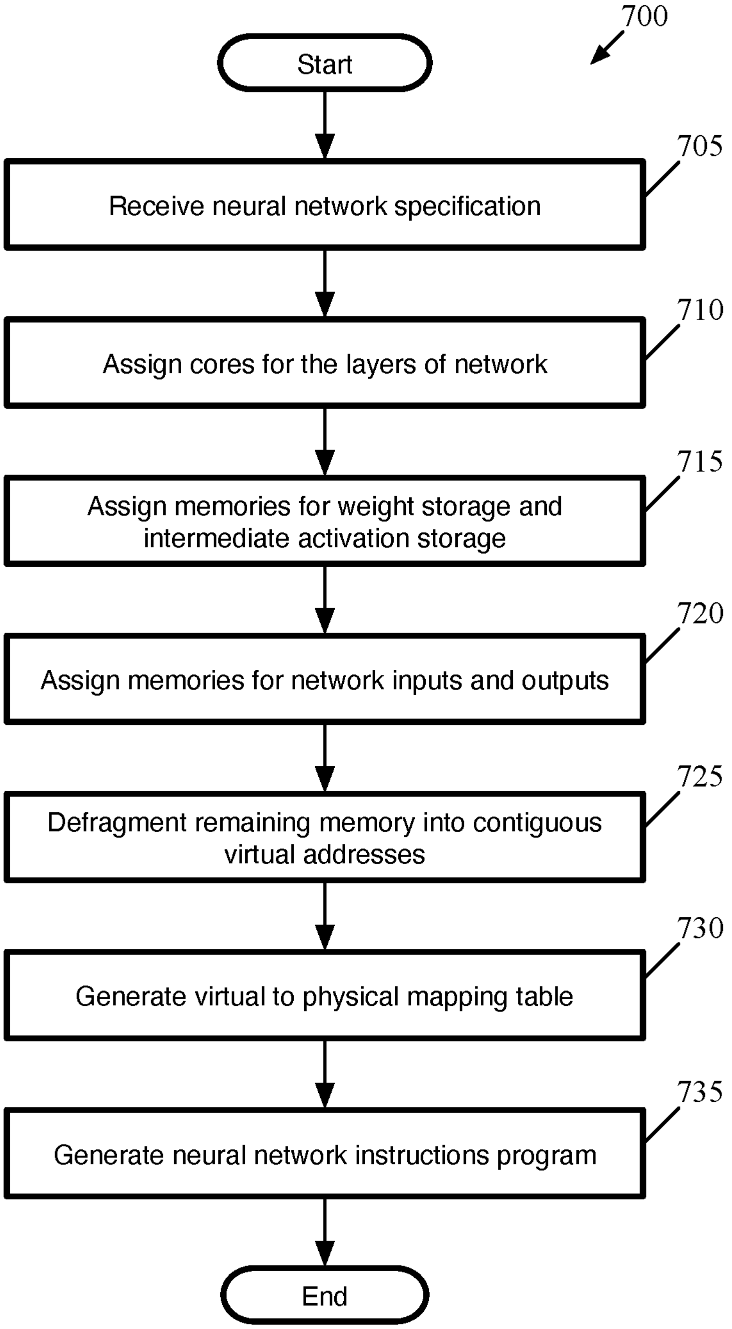
FIG. 7 conceptually illustrates a process of some embodiments for generating a neural network instructions program to be executed by an IC including a neural network inference circuit.

FIG. 7 conceptually illustrates a process 700 of some embodiments for generating a neural network instructions program to be executed by an IC including a neural network inference circuit. In some embodiments, the process 700 is performed by a compiler program that is specifically designed to generate optimized neural network program instructions for a particular type of IC that executes neural networks.

As shown, the process 700 begins by receiving (at 705) a neural network specification. In some embodiments, such a neural network specification includes specifications for each layer of the network as well as the order of the layers. These layer specifications may include the number of input channels, number of filters (and therefore the number of output channels), weight values for each filter (e.g., as ternary values with layer and/or filter-specific scales), bias and/or affine transforms for each filter, activation functions, and other data required to define the neural network.

The process 700 then assigns (at 710) cores of the IC for each layer of the neural network. In some embodiments, this core assignment involves various optimizations to determine how to minimize the power and/or memory usage. Optimized core assignment is described in more detail in U.S. patent application Ser. No. 16/525,445, which is incorporated herein by reference.

Next, or as part of the core assignment operation, the process 700 assigns (at 715) memories for weight storage and intermediate activation storage. That is, the compiler does not just determine which cores execute which layers of the network, but determines the memory location for each weight value and each intermediate activation. In some embodiments, the execution of a neural network by the IC is a completely deterministic process. Each time the IC executes the network, the same number of activation values will be generated for each layer, stored in the same memory locations, etc. (though the actual values will of course be different, depending on the input). The memories for each core are assigned to weight values and intermediate activation values such that the cores that execute each particular layer have the appropriate weight values and intermediate activation values (the input values for the particular layer) stored in their memories. In some embodiments, the memory banks to which weight values and intermediate activation values are assigned are only allowed to be used for these values, so these values are compressed by the compiler into as few memory banks as possible.

The process 700 then assigns (at 720) memories for the network inputs and outputs. It should be noted that the network inputs are typically the inputs to (at least) the first layer of the network, and therefore are stored in the core(s) that execute this first network layer. Images are typically defined in three channels (e.g., red/green/blue), and the nature of how the input channels for a layer are stored in the neural network computation fabric of some embodiments means that three cores are used for the inputs. Like the weight and intermediate activation values, some embodiments require that the memory banks assigned to network inputs be used only for those inputs (e.g., not for weight or intermediate activation values). Outputs are typically smaller (sometimes only a single value, a set of coordinates in an image, etc.). As described in more detail below, some embodiments assign two sets of memory banks for storing network inputs and/or outputs, to allow for double buffering of the inputs and outputs (i.e., so that the network can execute for a first input while a second input is being stored in the unified memory).

With the memory banks to be used by the computation fabric assigned (for inputs, outputs, weights, and activations), the process 700 then defragments (at 725) the remaining memory banks into contiguous virtual addresses. That is, the virtual addressing scheme takes a fragmented set of memory banks and maps these into a contiguous set of addresses that can be used by the CPU and input processing circuit.

Figure 8:
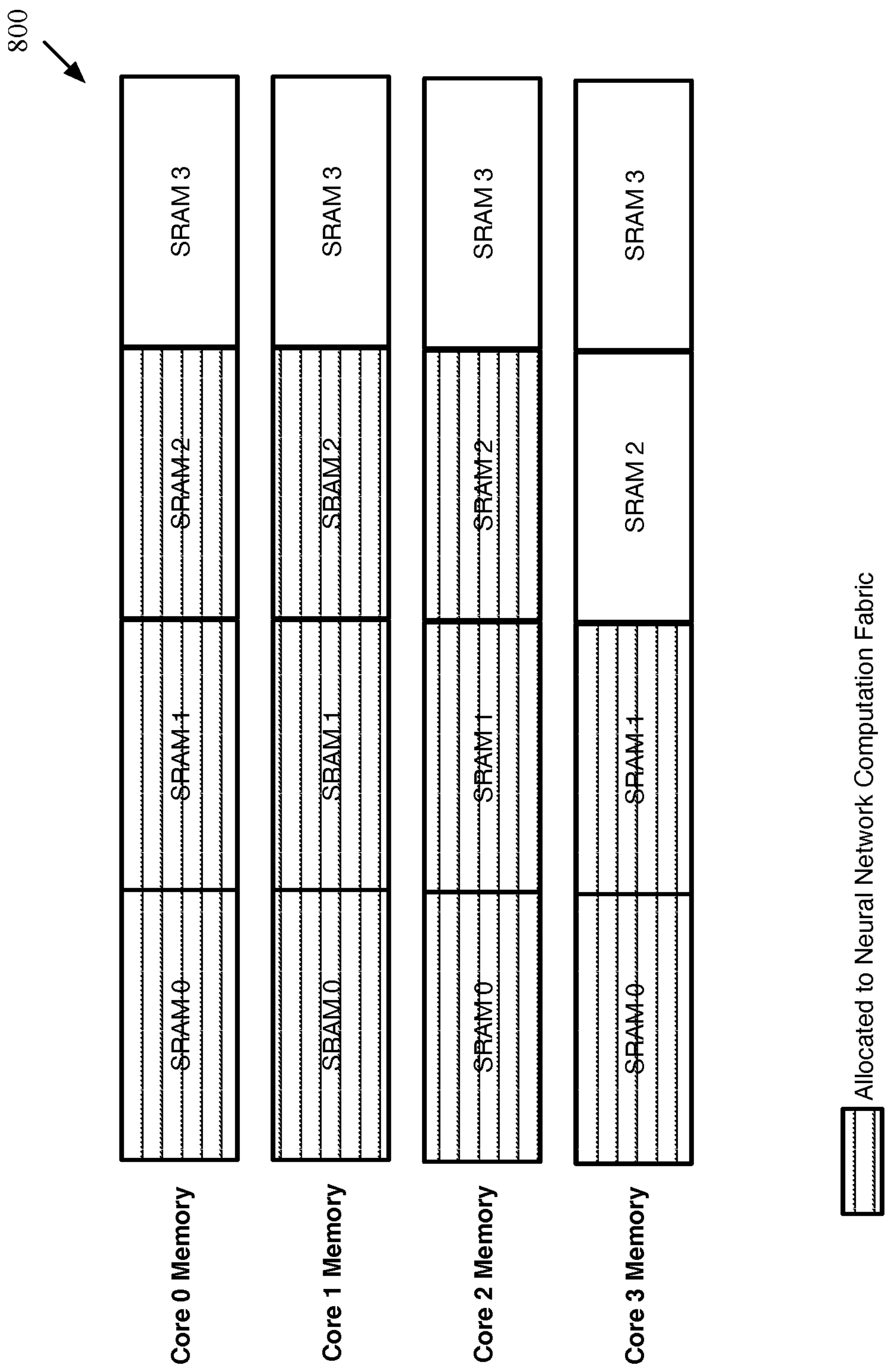
FIG. 8 conceptually illustrates the allocation of memory banks of a unified memory for an example IC.
Figure 9:
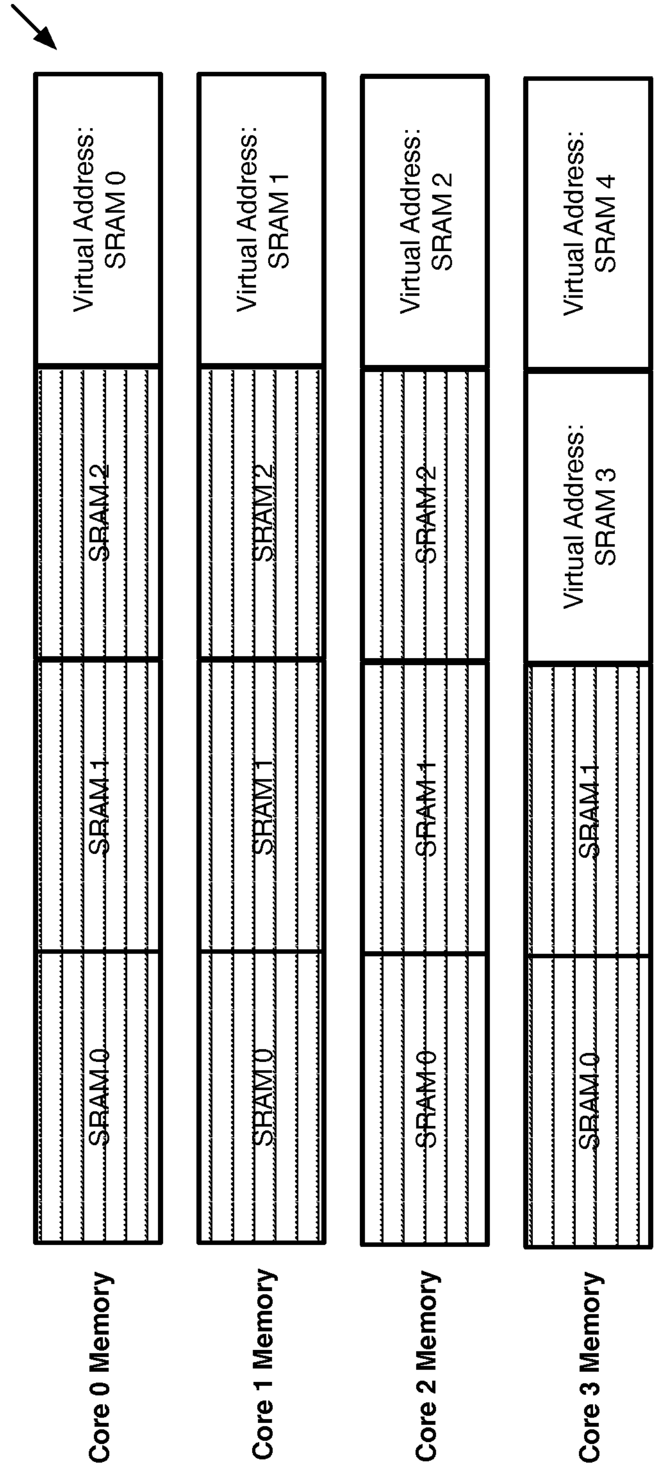
FIG. 9 conceptually illustrates the virtual addressing of unused memory banks in the unified memory of FIG. 8.

FIG. 8 conceptually illustrates the allocation of memory banks of a unified memory 800 for an example IC. In the example, the unified memory includes four memory banks (SRAMs 0-3) for each of four cores. As shown, SRAMs 0-2 are allocated to weights/activations, inputs, and/or outputs for each of the first three cores, while SRAMs 0-1 are allocated to these purposes for the fourth core. This leaves five memory banks available for the CPU and input processing circuit. However, the physical addresses of these five memory banks are fragmented because there are unavailable physical memory banks in between them. FIG. 9 conceptually illustrates the virtual addressing of the five unused memory banks in the unified memory 800. Here, these five SRAMs are renumbered 0-4 in a defragmented virtual addressing scheme so that virtual addresses to these five memories will be contiguous.

Returning to FIG. 7, the process 700 generates (at 730) a virtual to physical address mapping table. In some embodiments, the system memory interface of the IC uses this table to map virtual addresses for read/write commands to the correct physical memory addresses. FIG. 9 conceptually illustrates a virtual to physical address mapping table 900 that maps the virtual memory banks (SRAM numbers) to physical memory banks identified by core and SRAM number. In some embodiments, the mapping table is implemented as an offset that takes a virtual memory address and offsets it by a certain amount to account for the difference between the address in the virtual addressing scheme and the physical address. For instance, addresses within the first virtual memory bank (SRAM 0) correspond to the fourth physical memory bank (SRAM 3 of core 0). In this case, the offset would add three memory banks worth of memory address value to the virtual address. Addresses within the second virtual memory bank (SRAM 1) correspond to the eighth physical memory bank (SRAM 3 of core 1), so the offset for addresses within this virtual memory bank adds six memory banks worth of addresses, and so on for each of the memory banks.

Finally, the process 700 generates (at 735) a neural network instructions program for the IC of some embodiments, then ends. As described in more detail in U.S. patent application Ser. No. 16/525,445, incorporated by reference, this neural network instructions program includes instructions for loading weight values into the unified memory and instructions for executing each layer of the network. At a lower level, in some embodiments, the program generated by the compiler instructs the firmware how to program the virtual to physical address mapping table in the system memory interface. The firmware will also direct the CPU to load the weight values into the correct locations in the unified memory and load the neural network instructions program for the computation fabric, as described above.

Figure 10:
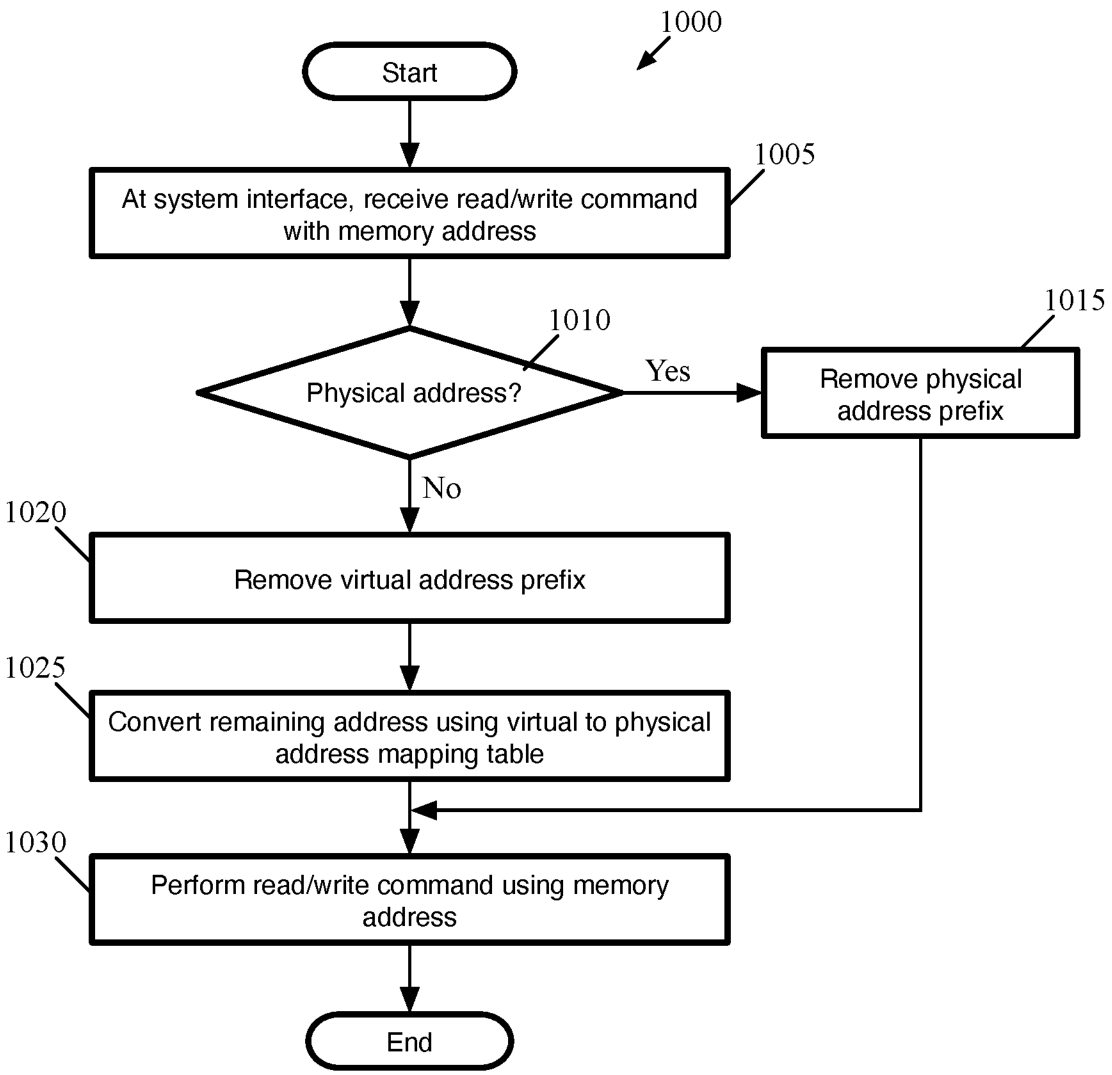
FIG. 10 conceptually illustrates a process of some embodiments for performing memory read and write commands.

As noted, when the system memory interface receives a read or write command from the CPU or input processing circuit, this interface has to determine the type of memory address that is received and perform the read/write command. FIG. 10 conceptually illustrates a process 1000 of some embodiments for performing memory read and write commands. In some embodiments, the process 1000 is performed by a system memory interface that handles read and write commands that use both virtual and physical addresses.

As shown, the process 1000 begins by receiving (at 1005), at the system memory interface, a read/write command (i.e., a read command or a write command) with a memory address. This could be a command from the input processing circuit to write input data to the unified memory, a command from the CPU to read network output from the unified memory, a command from the CPU to read or write intermediate post-processing data to the unified memory, etc.

The process 1000 then determines (at 1010) whether the received memory address is a physical address or a virtual address. In some embodiments, memory addresses provided to the system memory address have prefixes that are used to differentiate virtual and physical addresses. These may be single bit prefixes (e.g., 0 for physical address and 1 for virtual address) or multi-bit prefixes (e.g., 32-bit prefixes that match the length of the actual addresses) in different embodiments. Based on the prefix, the system memory interface can determine whether the address is a physical address or a virtual address.

If the received address is a physical address, then the process 1000 removes (at 1015) the physical address prefix and proceeds to 1030, described below. In this case, the underlying memory address does not need to be adjusted, so the system memory interface just removes the physical address prefix and uses the underlying (correct) physical address.

On the other hand, if the received address is a virtual address, then the process 1000 removes (at 1020) the virtual address prefix and converts (at 1025) the underlying address using the virtual to physical address mapping table. In some embodiments, as mentioned, this table uses an offset to map virtual addresses to physical addresses (after removing the virtual address prefix). In some embodiments, the address format uses the most significant bits (e.g., 17 out of 32 bits) to specify the memory bank, with the least significant bits specifying the location within that memory bank. In this case, only the most significant bits are remapped by the virtual to physical address mapping table (i.e., to specify the correct memory bank), while the other bits are passed through without change.

After performing the necessary conversion, the process 1000 performs (at 1030) the read/write command using the remaining memory address. In some embodiments, the memory interface either writes data received with the memory address to the appropriate location specified by the converted memory address or reads data from the location specified by the converted memory address and returns that data to the requesting circuit.

As noted above, when allocating memory banks for weights, activation values, inputs, etc., some embodiments allocate twice as many memory banks for input as are required to store a single network input. In some embodiments, this enables the computation fabric to execute the network for a first network input that was previously written to a first set of memory banks by the input processing circuit while (i) the input processing circuit writes a second network input to a second set of memory banks and/or (ii) the microprocessor reads (and performs post-processing on) a network output generated by the computation fabric for a third, prior network input.

Figure 11:
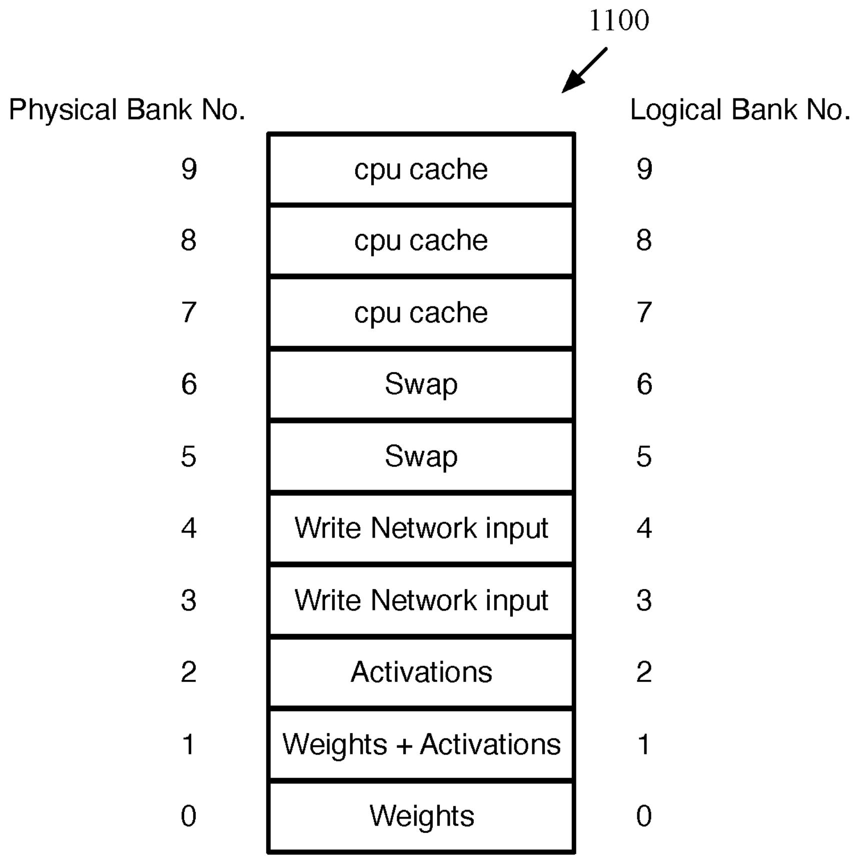
FIG. 11 conceptually illustrates the allocation of a set of memory banks in the unified memory of some embodiments.

FIG. 11 conceptually illustrates the allocation of a set of memory banks 1100 in the unified memory of some embodiments. While it should be understood that the memory banks are associated with different cores of the computation fabric and each type of memory allocation could be assigned to multiple cores (e.g., the memories for any core used in the execution of the network will have at least one memory bank allocated to storing weight values). As shown, this example shows ten memory banks (with physical bank numbering 0-9). In this case, memory banks 0-2 are allocated to weight and/or intermediate activation values (with the weight values stored in memory banks 0 and 1 and the intermediate activation values stored in memory banks 1 and 2. Each network input (e.g., each image in a streaming video sequence analyzed by the neural network) requires two memory banks, so memory banks 3 and 4 are allocated to network input while memory banks 5 and 6 are shown as allocated to "swap". In this and the subsequent examples, "swap" refers to the memory banks allocated for the network input prior to the network input that the input processing circuit is currently writing to the unified memory. The remaining memory banks 7-9 are shown as allocated to the cpu cache, and would be addressed by the CPU using virtual memory addressed.

The neural network instructions that specify, e.g., from which memory locations to read weight and activation values, and to which memory location to write intermediate activation values, for a given layer of the network, are unchanged each time the computation fabric executes the network. While this is not an issue for the weight values and intermediate activation values, if a second network input is written to a different set of memory banks than the first network input, then the same instructions that correctly specified memory locations from which to read the input activations of the first layer when the network is executed for the first network input will not specify the correct memory locations for reading the input activations when the network is executed for the second network input.

To solve this problem, the IC firmware of some embodiments programs a logical address to physical address translation table in the computation fabric before each execution of the network for a new input. The instructions for the cores to read weight and activation values (and write activation values) are given as logical memory addresses, which the computation fabric converts to physical addresses before accessing the unified memory to perform the read/write operations. It should be noted that the logical memory addresses and physical memory addresses should always match up for the memory banks storing weight and activation values; it is only the network inputs that are changed between subsequent network executions. In addition, it should be noted that while some embodiments program the logical address to physical address mapping table in the computation fabric (e.g., in each core of the fabric, as the table could be different for different cores), other embodiments program this table in the unified memory interface between the fabric cores and the memory banks (e.g., at each port between a core and its associated memory banks).

Returning to FIG. 11, this figure shows the physical memory bank number and the logical memory bank number for each memory bank of the unified memory 1100. Like the virtual to physical address mapping table used by the system memory interface of some embodiments, the logical to physical address mapping table only maps the number of the memory bank in the memory address; the location within that memory bank remains unchanged by the table. Unlike the virtual to physical address mapping table, the logical to physical address mapping table is applied to all memory addresses (i.e., there is no prefix required to differentiate between the two address spaces).

For the IC to execute a network using this synchronous execution/input/output scheme, in some embodiments the compiler allocates the first set of memory banks for the input processing circuit to write the first input (and third input, fifth input, etc.) and the second set of memory banks for the input processing circuit to write the second input (and fourth input, sixth input, etc.). While the computation fabric executes the network for the first input, the first set of memory banks are allocated for storing the current input (which the fabric reads in at least the first layer of the network), and in some embodiments can be used as intermediate activation storage for subsequent layers once the input is no longer needed. During this execution, the input processing circuit writes the second input to the second set of memory banks. Once execution is complete, the firmware modifies the logical address to physical address translation table in the computation fabric so as to swap the logical addresses of the first and second sets of physical memory banks. Thus, while the computation fabric executes the network (using the same instructions) for the second input, the second set of memory banks are allocated for storing the current input.

FIG. 12 conceptually illustrates the changing of the logical to physical address mapping table for the unified memory 1100 over the course of several executions of the network for subsequent inputs. As noted above by reference to FIG. 11, the memory banks labeled as "write network input" represent the memory banks to which the input processing circuit is currently writing the next network input. The memory banks labeled as "swap" represent the memory banks that store the network input for the current execution of the network.

A first stage 1205 illustrates the unified memory in the initial condition, which is the same as is shown in FIG. 11. At this point, the logical addresses and the physical addresses match up, with the network input being written to memory banks 3 and 4 and the memory banks 5 and 6 existing as "swap" banks. While the first network input (i.e., Input0) is being written, the computation fabric is not actually executing the network.

The second stage 1210 illustrates the allocation of the memory banks of the unified memory 1100 during the execution of the network for the first network input. This is referred to as an even input as the configuration is used for Input0, Input2, Input4, etc. At this stage, the firmware has swapped the "write network input" memory banks with the "swap" memory banks. This allows the computation fabric to read the first network input (Input0) from physical memory banks 3 and 4 using logical memory bank addresses 5 and 6 via the programmed logical to physical memory address mapping table while the input processing circuit is instructed to write the second network input (Input1, an odd network input) to physical memory banks 5 and 6.

The third stage 1215 illustrates the allocation of the memory banks of the unified memory 1100 during the execution of the network for the second network input. This is referred to as an odd input as the configuration is used for Input1, Input3, Input5, etc. At this stage, the firmware has swapped the "write network input" memory banks with the "swap" memory banks, so that the logical memory addresses again match with the physical memory addresses. This allows the computation fabric to read the second network input (Input1) from physical memory banks 5 and 6 using logical memory bank addresses 5 and 6 while the input processing circuit is instructed to write the second network input (Input2, another even network input) to physical memory banks 3 and 4.

Finally, the fourth stage 1220 illustrates the allocation of the memory banks of the unified memory 1100 during the execution of the network for the third network input. In this example, the allocation of the memory banks is the same first configuration for all of the even network inputs and the same second configuration for all of the odd network inputs. When the IC executes a single network, so long as there is enough unified memory to allocate double the number of memory banks that are required for a single network input, then the input processing circuit can write the next network input and the CPU can read the last network output while the computation fabric executes the network for the current input.

In some embodiments, the IC can be configured to execute multiple networks. Some embodiments allow the execution of up to one network per cluster of the computation fabric (e.g., up to four networks in the examples of FIGS. 5 and 6). These networks may have the same inputs, different inputs from the same sensor, different inputs from different sensors, etc.). For instance, an IC might execute two networks analyzing different images from different cameras, one network analyzing images and one network analyzing audio, etc. In this case, different options are available for efficiently executing the networks such that the network inputs are written to the unified memory while the networks are executing.

In a first scheme, all of the networks execute simultaneously (e.g., in different sets of cores of the computation fabric) while the inputs are written to the unified memory. Described in terms of two networks, in this scheme the input processing circuit(s) alternate between writing inputs for the first network to first and second sets of memory banks and writing inputs for the second network to third and fourth sets of memory banks.

FIG. 13 conceptually illustrates the changing of the logical to physical address mapping table for the memory banks of unified memory 1300 over the course of several concurrent executions of two networks for subsequent inputs. Here, as in the previous example for a single network, memory banks 0-2 are allocated to weight and/or intermediate activation values. The network inputs for the first network A require two memory banks, so memory banks 3 and 4 are allocated to network input for network A while memory banks 6 and 7 are allocated as "swap" banks for network A. Each network input for the second network B requires only a single memory bank, so memory bank 5 is allocated to network input for network B while memory bank 8 is allocated as a "swap" bank for network B. The sole remaining memory bank 9 is allocated to the cpu cache.

The first stage 1305 of FIG. 13 illustrates the unified memory 1300 in its initial condition, as described in the previous paragraph. At this point, the logical addresses and the physical addresses match up, with the input for network A being written to memory banks 3 and 4 and the input for network B being written to memory bank 5. While the first network input (e.g., InputA0 and InputB0) for each of these networks is being written, the computation fabric is not yet actually executing either network.

The second stage 1310 illustrates the allocation of the memory banks of the unified memory 1300 during the execution of both networks for their respective first network inputs. Because the networks execute concurrently, the firmware has swapped the "write network input" memory banks with the "swap" memory banks for each of the networks. This allows the computation fabric core (i) to read the first network input for network A from physical memory banks 3 and 4 using logical memory bank addresses 6 and 7 and (ii) to read the first network input for network B from physical memory bank 5 using logical memory bank address 8 via the programmed logical to physical memory address mapping table. At the same time that the computation fabric executes both of these networks, the input processing circuit is instructed (i) to write the second network input for network A (InputA1) to physical memory banks 6 and 7 and (ii) to write the second network input for network B (InputB1) to physical memory bank 8.

The third stage 1315 illustrates the allocation of the memory banks of the unified memory 1300 during the execution of both networks for their respective second network inputs (i.e., the configuration used during execution of the second, fourth, sixth, etc. inputs). The firmware has again swapped the "write network input" memory banks with the "swap" memory banks for each of the networks, so that the logical memory addresses again match with the physical memory addresses. This allows the computation fabric core (i) to read the second network input for network A from physical memory banks 6 and 7 using logical memory bank addresses 6 and 7 and (ii) to read the second network input for network B from physical memory bank 8 using logical memory bank address 8. At the same time that the computation fabric executes both of these networks, the input processing circuit is instructed (i) to write the second network input for network A (InputA1) to physical memory banks 3 and 4 and (ii) to write the second network input for network B (InputB1) to physical memory bank 5.

Finally, the fourth stage 1320 illustrates the allocation of the memory banks of the unified memory 1300 during the execution of both networks for their respective second network inputs. As with the single network example, the allocation of the memory banks is the same first configuration for all of the even network inputs (InputA0 and InputB0, InputA2 and InputB2, etc.) and the same second configuration for all of the odd network inputs (InputA1 and InputB1, InputA3 and InputB3, etc.). The concurrent execution of multiple networks provides a benefit that it reduces the amount of time required to execute the networks, as opposed to only executing one network at a time (or not using a double buffering scheme at all, such that neither network executes while the inputs are being written). In addition, the logical to physical memory address mapping table can be determined by the compiler, because this table simply alternates between the odd and even mappings.

However, the downside to this concurrent execution scheme is the extensive use of memory. If the combined network inputs for all of the networks use a total of X memory banks, then 2X memory banks need to be allocated for this purpose (e.g., 6 memory banks are allocated in the example of FIG. 13). A second scheme, on the other hand, only executes one of the networks at a time but saves on memory consumption by the network inputs. In this scheme, enough memory banks are allocated for the input processing circuit(s) to write inputs for all of the networks simultaneously, but the number of memory banks allocated for the computation fabric to read a network input is only equal to the largest number of memory banks allocated for a single network input. In this scheme, responsibility for updating the logical address to physical address translation table is assigned to the firmware to perform at runtime (rather than determined ahead of time by the compiler) because the order in which the networks will be executed is not known at compile time.

Figure 14B:
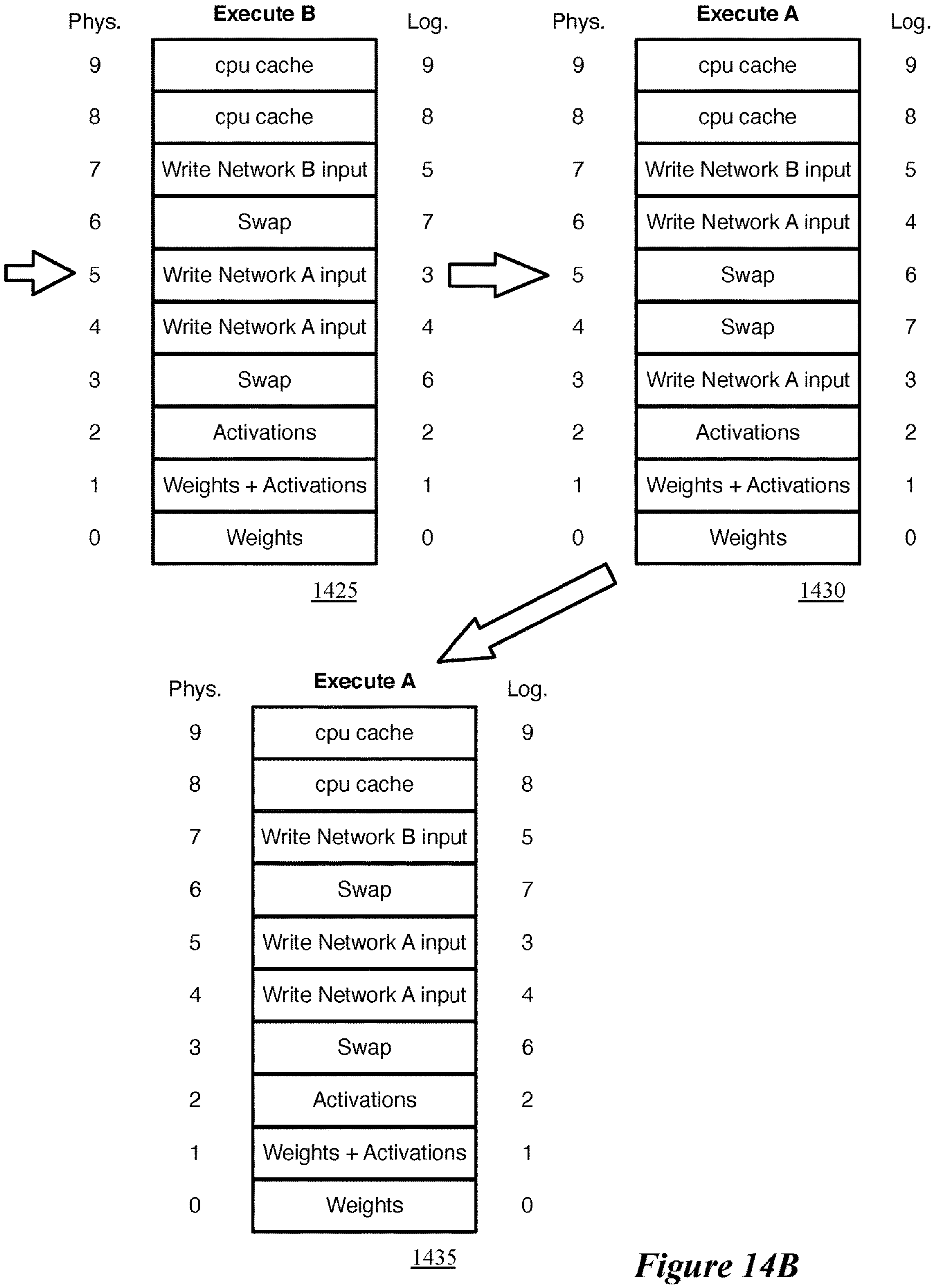

FIGS. 14A-B conceptually illustrate the changing of the logical to physical address mapping table for the memory banks of unified memory 1400 over the course of several executions of two networks. In this example, only one network is executed at a time, which saves memory over the option of having both networks execute concurrently. In addition, the networks are not guaranteed to alternate, so the logical to physical address mapping table needs to be determined on-the-fly by the IC firmware based on which network will be executed next. For instance, a device that has a first network for analyzing streaming video images (e.g., to perform face detection) and a second network for analyzing audio snippets whenever audio is received might analyze numerous video images in between audio snippets.

As shown in the first stage 1405, memory banks 0-2 are again allocated to weight and/or intermediate activation values. The network inputs for the first network A require two memory banks, so memory banks 3 and 4 are allocated to network input for network A. The network inputs for the second network B require a single memory bank B, so memory bank 5 is allocated to network input for network B. Network A is therefore the network that requires the maximum number of memory banks for its input (two), so two memory banks are allocated as "swap" banks (without a specific network designation). The two remaining memory banks 8 and 9 are allocated to the cpu cache. At this point, the logical addresses and physical addresses match up, with the input for network A being written to memory banks 3 and 4 and the input for network B being written to memory bank 5 (assuming inputs are received at respective sensors for both networks). While the first network input (e.g., InputA0 and InputB0) for each of these networks is being written, the computation fabric is not yet actually executing either network.

The second stage 1410 illustrates the allocation of the memory banks of the unified memory 1400 when the computation fabric executes network A first for its first input (InputA0). Because network A is being executed, the firmware has swapped the "write network A input" memory banks with the "swap" memory banks, while leaving the "write network B input" memory bank in the same location. This allows the computation fabric cores to read the first network input for network A from physical memory banks 3 and 4 using logical memory bank addresses 6 and 7. The firmware has also instructed the CPU to provide the network A program instructions to the computation fabric, so that the fabric cores can perform these read operations (and the subsequent network operations). While the computation fabric executes network A, the input processing circuit(s) (i) write the second network input for network A (InputA1) to physical memory banks 6 and 7 and (ii) continue to write (if still receiving data) the first network input for network B (InputB0) to physical memory bank 5.

The third stage 1415 illustrates the allocation of the memory banks of the unified memory 1400 when the computation fabric next executes network B for its first input (InputB0). Here, to enable the execution of network B while the next input for that network is being written to the unified memory, the firmware swaps the "write network B input" memory bank with one of the "swap" memory banks (specifically with the memory bank having logical address 6), while leaving the "write network A input" memory bank in the same location as the previous stage 1410. This allows the computation fabric cores to read the first network input for network B from physical memory bank 5 using logical memory address 6 (the memory bank specified in the neural network instructions provided to the computation fabric by the CPU). The firmware has also instructed the CPU to provide these network B program instructions to the computation fabric, so that the fabric cores can perform these read operations (and the subsequent network operations). While the computation fabric executes network B, the input processing circuit(s) (i) continue to write (if still receiving data) the second network input for network A (InputA1) to physical memory banks 6 and 7 and (ii) write the second network input for network B (InputB1) to physical memory bank 3. During this stage, physical memory bank 4 (logical memory bank 7) is unused.

In the fourth stage 1420, the computation fabric executes network A again, this time for its second input (InputA1). Here, because network A is being executed, the firmware has again swapped the "write network A input" memory banks with the "swap" memory banks, while leaving the "write network B input" memory bank in the same location. However, the logical to physical address mapping table programmed in the fabric cores at stage 1420 is not the same as a previous logical to physical address mapping table (including the initial conditions), because network B was executed in the interim and so the "swap" memory banks have moved around.

In this case, the computation fabric core reads the second network input for network A from physical memory banks 6 and 7 using logical memory addresses 6 and 7 (these swap banks are back in the same locations as the initial condition). In order for the network instructions to specify the correct read operations for the network input, logical memory bank 3 is always swapped with logical memory bank 6 and logical memory bank 4 is always swapped with logical memory bank 7 in order to execute network A.

The firmware has also instructed the CPU to provide the network A program instructions to the computation fabric, so that the fabric cores can perform the read operations (and subsequent network operations). While the computation fabric executes network A, the input processing circuit(s) (i) write the third network input for network A (InputA2) to physical memory banks 4 and 5 (noting that if the network A input is written to memory bank 3 first and memory bank 4 second in the initial condition, the network A input is now written to memory bank 5 first and memory bank 4 second) and (ii) continue to write (if still receiving data) the second network input for network B (InputB1) to physical memory bank 3.

Next, at the fifth stage 1425, the computation fabric again executes network B, this time for its second input (InputB1). Because network B is being executed, the firmware has again swapped the "write network B input" memory bank with the "swap" memory bank having logical memory address 6, while leaving the "write network A input" memory banks in the same location. The logical to physical address mapping table programmed in the fabric cores at this stage has to be determined by the firmware based on the network B being executed next.

In this case, the computation fabric core reads the second network input for network B from physical memory bank 3 using logical memory address 6. In order for the network instructions to specify the correct read operations for the network input, logical memory bank 5 is always swapped with logical memory bank 6 in order to execute network B. As a result of this sequence of network executions (A→B→A→B), the "swap" memory banks are no longer next to each other. This does not pose a problem, in some embodiments, as the only requirement is that the "swap" banks and each set of "write network [X] input" banks be their own separate set of memory banks (i.e., memory banks are not shared between these allocations at any given time).

The firmware has also instructed the CPU to provide the network B program instructions to the computation fabric, so that the fabric cores can perform the read operations (and subsequent network operations). While the computation fabric executes network B, the input processing circuit(s) (i) continue to write (if still receiving data) the third network input for network A (InputA2) to physical memory banks 4 and 5 and (ii) write the third network input for network B (InputB2) to physical memory bank 7.

In the sixth stage 1430, the computation fabric executes network A for its third input (InputA2). Because network A is being executed, the firmware has again swapped the "write network A input" memory banks with the "swap" memory banks, while leaving the "write network B input" memory bank in the same location. This results in the "write network A input" memory banks being non-contiguous, which is not a problem in some embodiments. The computation fabric core reads the third network input for network A from physical memory banks 4 and 5 using logical memory addresses 6 and 7.

The firmware has also instructed the CPU to provide the network A program instructions to the computation fabric. While the computation fabric executes network A, the input processing circuit(s) (i) write the fourth network input for network A (Input A3) to physical memory banks 3 and 6 and (ii) continue to write (if still receiving data) the third network input for network B (Input B2) to physical memory bank 7.

Finally, in the seventh stage 1435, the firmware specifies for the computation fabric executes network A for its fourth input (InputA3), rather than network B. This could be due to no input being received that needs analysis by network B, the input for network B not being completely received and written to the unified memory, a trigger specifying that network A needs to be executed again, or another reason. In this case, the allocation for the unified memory 1400 is swapped back to being the same as the fifth stage 1425. However, this time the "swap" memory banks 3 and 6 store the network A input and this network is executed.

Thus, the firmware instructs the CPU to provide the network A program instructions to the computation fabric, so that the fabric cores can perform the read operations from physical memory banks 3 and 6 (as well as subsequent network operations). While the computation fabric executes network A, the input processing circuit(s) (i) writes the fifth network input for network A (InputA4) to physical memory banks 5 and 4 and (ii) continue to write (if still receiving data) the third network input for network B (InputB2) to physical memory bank 7.

This seventh stage 1435 illustrates that the order in which a set of networks will be executed cannot necessarily be predetermined, and thus the compiler cannot determine the logical to physical memory address mapping table ahead of time. If this order was known, the compiler could determine the mapping table for each subsequent execution, and the changes to the mapping table would follow a deterministic cycle. However, because the same network might be executed multiple times in a row, the responsibility for determining (i) which network is executed next and (ii) the logical to physical address mapping table that specifies which memory banks will be used for reading network input and which memory banks will be used for writing the next inputs for each network being executed by the IC falls to the firmware.

Figure 15:
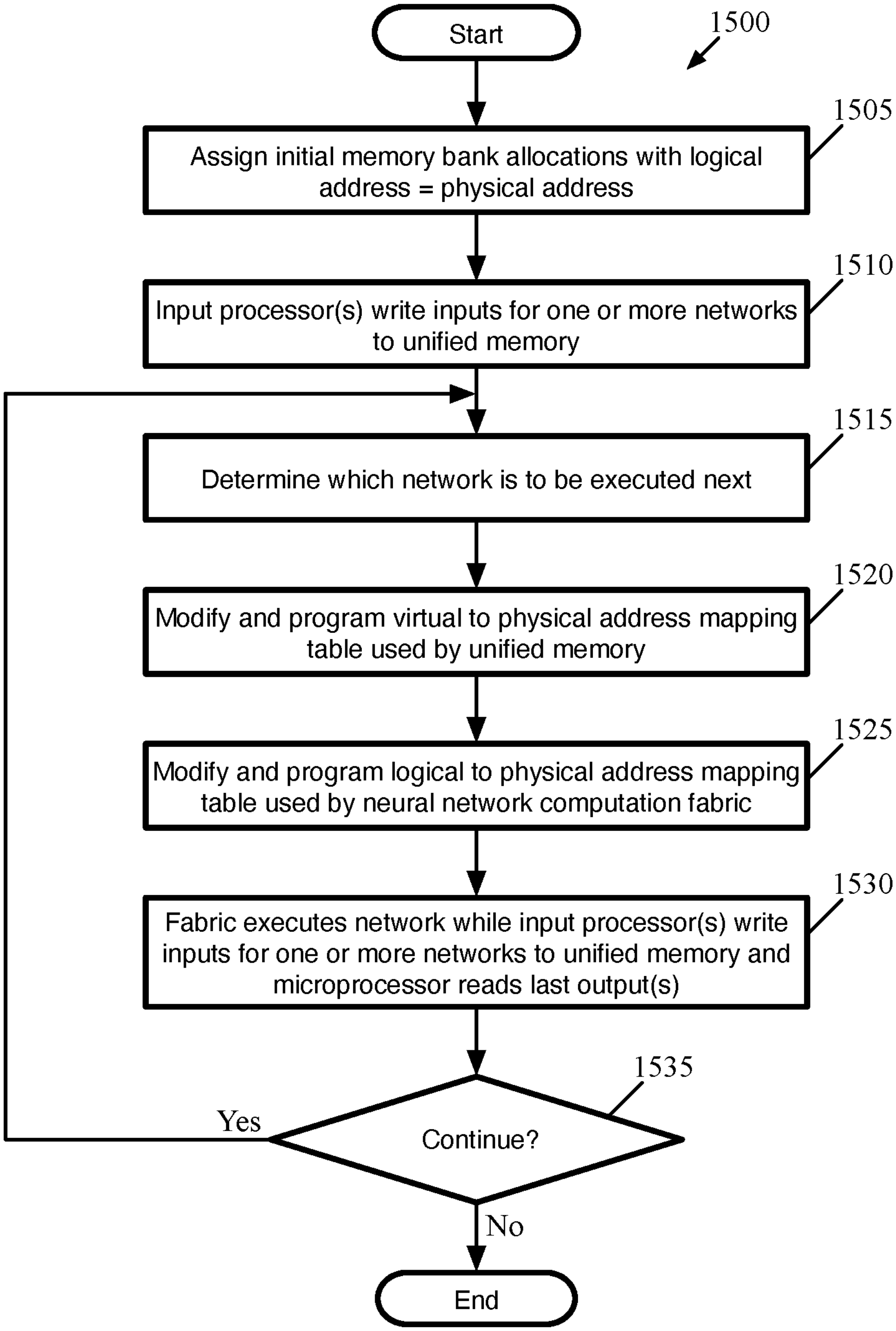
FIG. 15 conceptually illustrates a process of some embodiments for executing multiple networks on an IC when only enough memory banks are allocated for one network to be executed at one time.

FIG. 15 conceptually illustrates a process 1500 of some embodiments for executing multiple networks on an IC in the scheme described above in which only enough memory banks are allocated for one network to be executed at one time. In some embodiments, the process 1500 is performed by at least in part by the IC firmware, which is responsible for determining which neural network to execute in this scheme. In some embodiments, the process 1500 is performed continuously once the IC is booted up (e.g., when a device containing the IC is powered on) until the IC is powered down.

As shown, the process begins by assigning (at 1505) initial memory bank allocations. At this point, the logical address is equal to the physical address for each memory bank in the unified memory. In addition, because the computation fabric is not executing a neural network, the logical to physical memory address mapping table does not need to be programmed. These initial conditions are predetermined by the compiler (i.e., they do not need to be determined at runtime by the firmware). Though not shown in this figure, the CPU loads the weight values (e.g., from off-chip non-volatile memory) into the unified memory and loads the program instructions for the networks to be executed (though does not provide these program instructions to the computation fabric yet).

Next, the input processor(s) write (at 1510) inputs for one or more networks to the unified memory. At this point, the computation fabric is not active because there is no input for which a network can be executed. Once the first input for one of the networks has been written to unified memory, the process determines (at 1515) which network is to be executed next. This decision could be based on the input for the network to be executed being the first input to be completely written to unified memory, an external trigger indicating that this network should be executed, etc. In some embodiments, the input processing circuit sends a signal to the CPU when the input processing circuit finishes writing a network input to the unified memory, and the order in which these signals are received determines the network execution order.

The process 1500 then modifies and programs (at 1520) the virtual to physical address mapping table used by the unified memory for certain read/write operations from the CPU and/or input processor. In some embodiments, this virtual to physical address mapping table changes with each execution of one of the networks (similar to the logical to physical address mapping table). In other embodiments, however, this mapping table is static, even as the memory banks used by the fabric for specific purposes change. In the latter case, the firmware programs the virtual to physical address mapping table once at bootup time and does not need to reprogram this table each time a network is executed.

The process 1500 also modifies and programs (at 1525) the logical to physical address mapping table used by the neural network computation fabric. As described by reference to FIGS. 14A-B, this mapping table has to be determined at runtime by the firmware, because the compiler does not know in advance the order in which the networks will be executed. This mapping table allows the use of consistent read/write instructions each time a network is executed even though the memory banks storing the network inputs will have moved.

With these tables programmed, the fabric executes (at 1530) the network (i.e., the network determined by the firmware at 1515) while the input processor(s) write inputs for one or more networks to the unified memory and the microprocessor (CPU) reads the last outputs. The first time executing a network, of course, there are no outputs to read. However, subsequently, the CPU can read the network output (which is typically a small amount of data relative to the network input) and perform additional analysis based on this network output (as well as previous network outputs that might be stored in the CPU cache).

The process 1500 then determines (at 1535) whether to continue executing neural networks. In some embodiments, the firmware automatically returns to operation 1515 once the current network has completed execution, unless the IC has been powered off or an error has occurred. That is, the IC continues to execute its neural networks so long as it is powered on and inputs are being received. Once execution is interrupted (e.g., by the IC being powered off), the process 1500 ends.

As described above by reference to FIGS. 4 and 5, the computation fabric of the IC of some embodiments has a particular circuit structure with multiple clusters of cores (for performing dot product operations) as well as a global channel for performing convolutional layer post-processing operations (e.g., bias, scaling, activation functions, etc.), transporting data between the cores, and other functions. It should be noted, however, that the unified memory principles described above are applicable to ICs with other neural network inference circuit structures as well.

Figure 16:
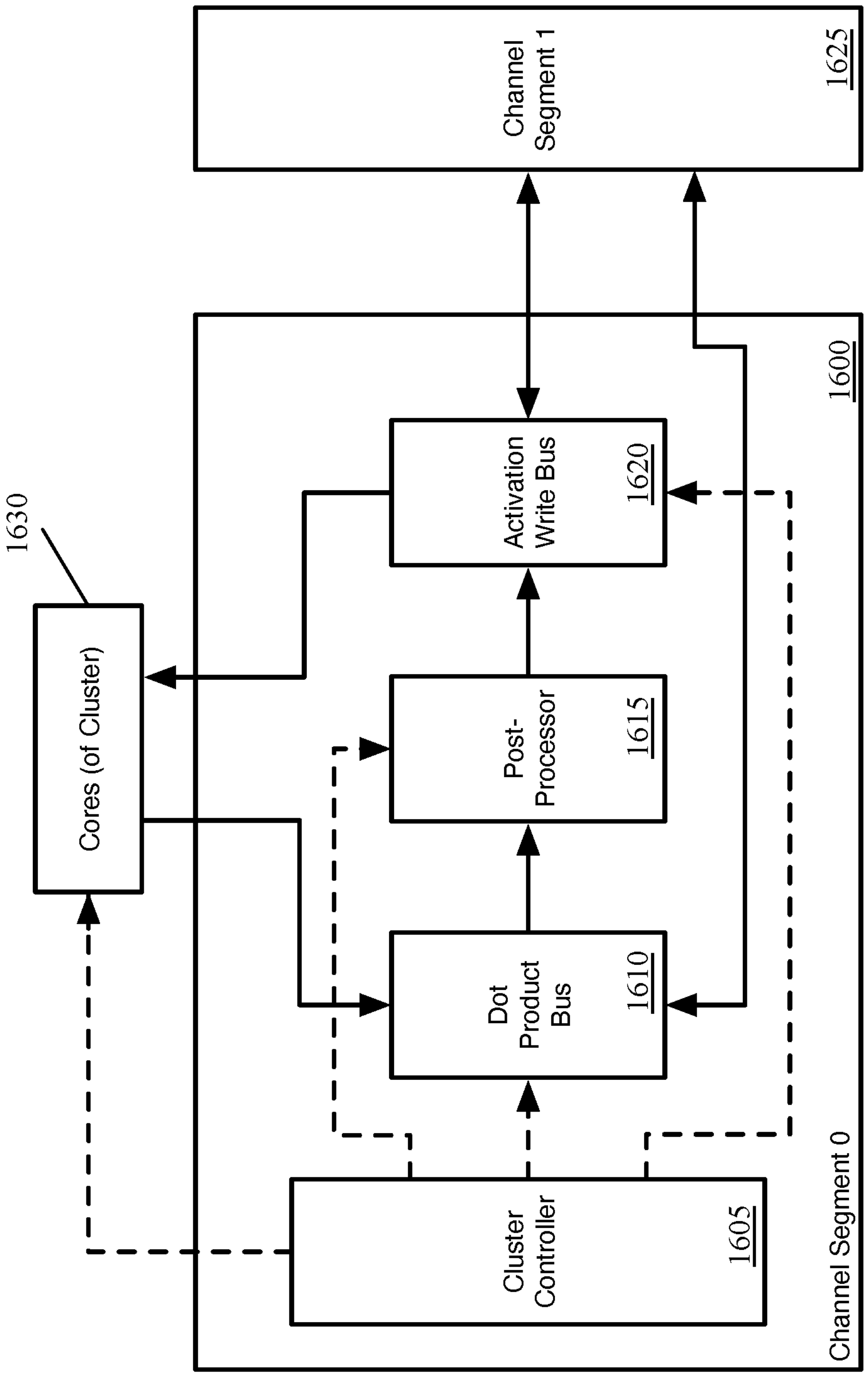
FIG. 16 conceptually illustrates the circuit blocks of a channel segment of some embodiments.

FIG. 16 conceptually illustrates the circuit blocks of a channel segment 1600 of some embodiments (e.g., one of the channel segments 530-545 shown in FIG. 5). The channel segment 1600 includes a cluster controller 1605, a dot product bus 1610, a post-processor 1615, and an activation write bus 1620 (also referred to as an output bus). In addition to the channel segment 1600, the figure also illustrates an additional channel segment 1625 and the cores 1630 of the local cluster for the channel segment 1600, as the circuit blocks of the channel segment 1600 exchange dot product and configuration data with these other segments. In this diagram, the dashed lines represent the flow of configuration data while the solid lines represent the flow of neural network computation node data for convolution or fully-connected layer nodes (i.e., nodes that use a dot product-based linear function). Additional neural network computation data, such as that flowing directly from the cores 1630 to the post-processor 1615 for pooling nodes or element-wise operators, is not shown.

The cluster controller 1605 configures the dot product bus 1610, post-processor 1615, and activation write bus 1620 as per the configuration instructions received from the fabric controller in some embodiments. For the dot product bus 1610, this configuration data specifies, in some embodiments, (i) which partial dot products are to be added together as part of the same neural network computation node and (ii) to which post-processing unit each aggregated dot product is sent (the post-processor 1615 of some embodiments includes numerous post-processing units with the same circuitry). In other embodiments, the post-processing unit that receives each aggregated dot product is not specified as configuration data because there are an equal number of dot product bus lanes and post-processing units, so that the data from each lane is provided as the primary input to a different post-processing unit.

For the post-processor 1615, the configuration data of some embodiments indicates (for each of the post-processing units) whether a dot product computation node or other computation node (e.g., pooling, element-wise operator) is being executed, the scaler and bias factors for a linear computation, the activation function to use (which may be specified, e.g., as a lookup table or a piecewise linear function), as well as other data. For the activation write bus 1620, the configuration data indicates to which cores each output value is to be delivered, in some embodiments.

As mentioned, the solid lines indicate the flow of neural network computation data, for a node in a convolutional or fully-connected layer. The cores 1630 (as well as, in some cases, cores of other clusters) compute partial dot products. For a given computation node, these partial dot products may be computed across multiple cores. In some embodiments, if more than one core is used to compute the dot products for a neural network layer, then the partial dot products for each node are computed across all of these active cores.

These partial dot products are output to the dot product bus 1610, which aggregates the partial dot products from the cores 1630 of the local cluster. The dot product bus 1610, in some embodiments, includes a number of independent dot product bus lanes that each receives partial dot products from the cores, aggregates these together, and provides the aggregated dot products to the post-processing circuits. In some embodiments, each lane of the dot product bus corresponds to (i) one of the adder trees in each of the cores (i.e., dot product bus lane N receives the partial dot products from each of the adder trees of index N in the cores), and (ii) one of the post-processing units in each of the clusters (i.e., dot product bus lane N provides its aggregated output to the post-processing unit Nin one of the clusters, as specified by the configuration data).

Each lane of the dot product bus 1610 spans all of the channel segments, and the dot product bus lanes in each channel segment aggregate the partial dot products from the cores of its local cluster. The dot product bus 1610 in the channel segment 1600 also exchanges locally-aggregated dot products with its neighboring segments for further aggregation if needed (i.e., if the source cores for the dot product computation span multiple clusters). In this case, the channel segment 1600 only has one neighboring segment, but internal channel segments (e.g., the segments 535 and 540 in FIG. 5) will have two such neighboring segments. The configuration data from the cluster controller 1605 specifies whether to send these dot products in one direction or the other along the global channel for each dot product bus lane, or to aggregate the dot products from the neighboring channels locally, depending on where post-processing will occur for each dot product.

The post-processor 1615 includes numerous post-processing units that receive the dot products from their corresponding dot product bus lane and perform the non-dot product functions of the neural network computation nodes. For a typical computation node of a convolutional (or fully-connected) layer, these functions includes an addition operation to account for the bias factor, a multiplication operation to account for the scaling factor, and a non-linear activation function. In some embodiments, the outputs of the linear function are quantized or truncated to a particular number of bits (e.g., 4 bits, 5 bits, 8 bits) by the activation function. Using a small, fixed number of bits for the outputs of each computation node allows for (i) power and resource savings by enabling smaller computations and (ii) certainty in the scheduling of computations (i.e., by knowing that all input values will be within a particular range) that enables further power and resource savings in design. The non-linear activation function, in some embodiments, is implemented as a lookup table or a piecewise linear function based on configuration data, rather than a hardwired function. This enables the IC to execute different neural networks that use different activation functions and, in some embodiments, allows for different activation functions to be used in different layers of the neural network or even for different filters in the same layer.

The activation write bus 1620 receives the computation node activation outputs from the post-processing units and carries these outputs back to the cores 1630, to be stored in the memory of the core and used as inputs for the computation nodes of the next layer of the neural network. The activation write bus connects to the cores 1630 in the local cluster as well as the activation write bus in the neighboring channel segment 1625. As with the dot product bus 1610, the activation write bus 1620 of some embodiments includes lanes, with each post-processing unit of the post-processor 1615 sending its output to a different one of these lanes.

In some embodiments, the output values may be computed by the post-processor 1615 in one cluster but carried by the activation write bus 1620 to a core in another cluster to be stored. For efficiency, the compiler of some embodiments attempts to optimize the location of the post-processing unit for each computation node output relative to the cores used to compute the constituent partial dot products for that computation node and the destination core for the output value. The activation write bus 1620 also includes a right shift circuit for each core that is used to align the output values for the core, in order for the values to be stored in contiguous blocks within the core RAM. Details of the various circuit blocks of the global channel of some embodiments are found in U.S. patent application Ser. No. 16/457,756, which is incorporated herein by reference.

Figure 17:
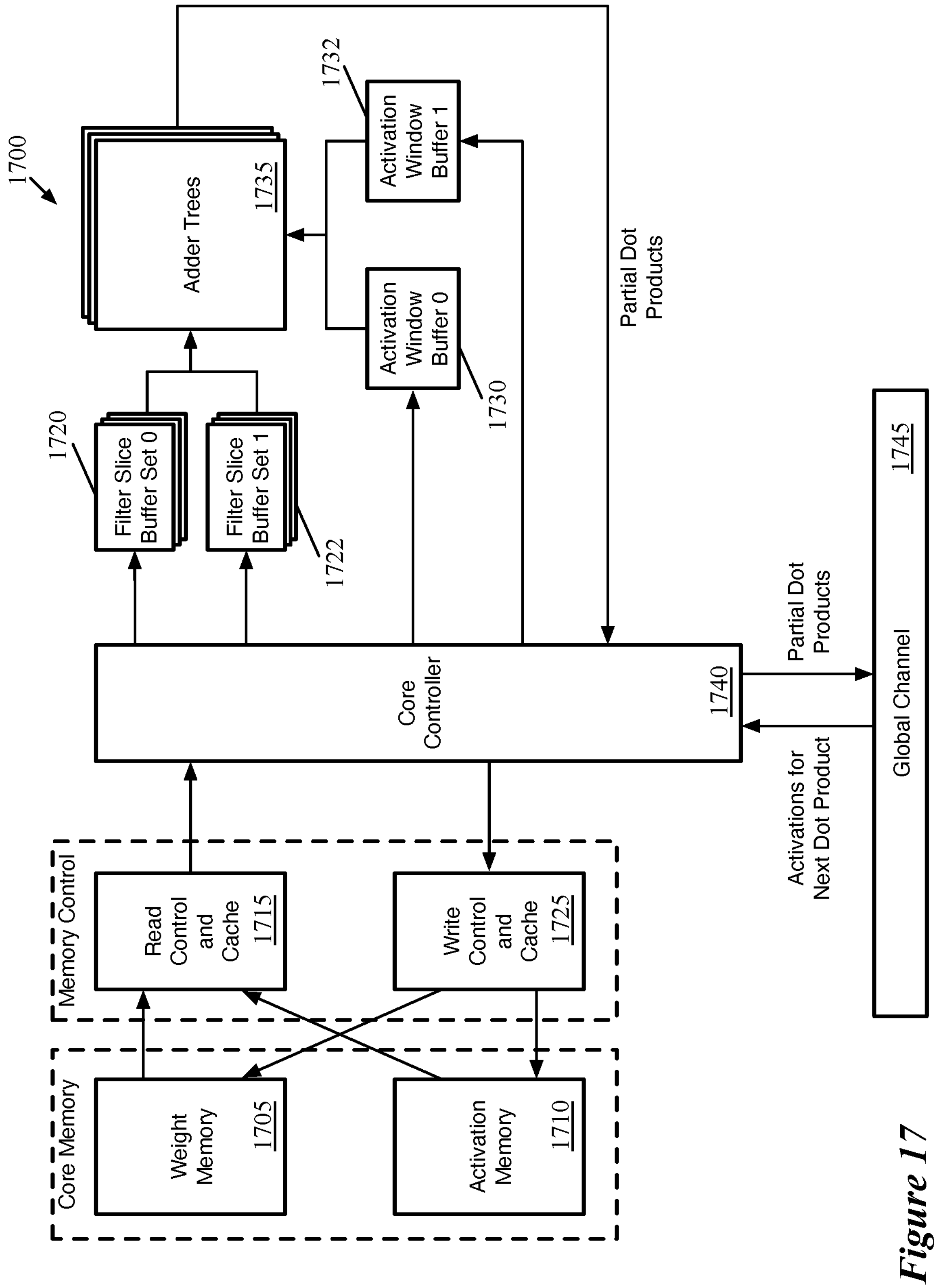
FIG. 17 conceptually illustrates the data flow within one of the cores of some embodiments for a dot product computation.

As mentioned, the dot product cores perform the majority of the dot product computation of the chip fabric of some embodiments. FIG. 17 conceptually illustrates the data flow 1700 within one of the cores of some embodiments for a dot product computation. This data flow will be described with certain specifics (e.g., weight and activation data sizes, number of separate adder trees simultaneously computing partial dot products, etc.) as examples, but it should be understood that different embodiments may use different sizes for weight data and/or activation values, different numbers of adder trees within a core, etc.

In some embodiments, the dot product cores store weight data values (e.g., weights for multiple nodes in multiple layers) in the weight memory 1705 and activation values in the activation memory 1710. As described above, in some embodiments these memories 1705 and 1710 are part of the unified memory shared by the dot product cores, the CPU, and the input processing circuit(s). The manner in which the weight data and activation values are stored in some embodiments is described in detail in U.S. patent application Ser. No. 16/457,756, which is incorporated by reference above.

The weight values are part of the network parameters and thus are determined at compile time (and do not change at runtime), while the activation values (the input values to a particular node being computed) are the output values from a previous computation (or, for the first layer, are based on the network input written to the correct location in unified memory by the input processing circuit) and thus are determined at runtime. Thus, the weight memory 1705 is typically larger than the activation memory 1710 (e.g., 512 KB to 64 KB), as the activation memory is at least party overwritten for each new layer of the neural network while the weight memory 1705 stores the weights for all of the dot product computations performed by the core. In some embodiments, the weights are encoded in such a manner that less than 1 bit of the weight memory 1705 is allocated per weight value (e.g., by encoding the weight values in such a way that many of the zeros are removed, while storing additional data for each non-zero weight value).

The read controller and read cache 1715 reads data from the weight memory 1705 into sets of filter slice buffers 1720 and 1722 that store the weight data to be used in the dot products. In some embodiments, as mentioned, a filter is a set of weights that is used to compute a dot product with a set of inputs (e.g., in order to identify a specific feature type within a portion of an image). Depending on the number of channels of the activation inputs, filters may be divided into multiple slices. Each filter, in some embodiments, is used repeatedly to compute dot products with numerous activation windows (e.g., contiguous sets of activation inputs). Some embodiments load data for 36 (or 40) weight values into each filter slice buffer, which are actually used to compute a larger number (e.g., 128, 144) of dot product components (with the requirement that at least 75% of the weight values be zero, the actual adder tree only receives 36-40 inputs for each buffer of a larger number of activation values).

Some embodiments include both primary filter slice buffers 1720 and secondary filter slice buffers 1722, as shown in this figure. In a given clock cycle, at most one of these sets of filter slice buffers is used to compute dot products (e.g., using multiplexers to select only one of the sets of weight value data). For simpler dot product computations, only the primary filter slice buffers 1720 are needed, so there is no need to load weight values into the secondary filter slice buffers 1722. However, in other cases, both sets of filter slice buffers may be used, as described below (e.g., when dot products are too large to be computed in a single clock cycle using only the primary buffers).

The read control and cache 1715 also reads data (layer input values) from the activation memory 1710 into the activation window buffers 1730 and 1732. In addition, the read controller 1715 arranges the input values within the activation window buffers 1730 and 1732 in some embodiments to match up with the weight values in the filters. In some embodiments, the input values in an activation window read into the buffers 1730 (and 1732) include all of the values (as opposed to the 25% of the values needed for a particular filter), because the activation window is multiplied by numerous filters simultaneously (i.e., some or all of the filters stored in the filter slice buffers). The input values, in some embodiments, are quantized to have a fixed size (e.g., 4 bits), or set of fixed sizes (e.g., 4 bits or 8 bits) for ease and simplicity of computation.

As with the sets of filter slice buffers, some embodiments include both a primary activation window buffer 1730 and a secondary activation window buffer 1732. In a given clock cycle, at most one of these sets of activation window buffers is used to compute dot products (e.g., using multiplexers to select only one of the sets of activation input values). For simpler dot product computations, only the primary activation window buffer 1730 is needed, so there is no need to load activation inputs into the secondary activation window buffer 1732. However, in other cases, both activation window buffers may be used (e.g., when dot products are too large to be computed in a single clock cycle using only the primary buffers).

In some embodiments, as shown, the same read controller and cache 1715 is used to read data from both the weight memory partition 1705 and the activation memory partition 1710 of the unified memory for the core. In such embodiments, the cache is used to store weight value data when reading the weights from the weight memory 1705. For each pass, this memory control circuit first reads the encoded weight data and provides this data to the core controller 1740 (which decodes weight data and loads the decoded weight data into the filter slice buffers), then reads input values and provides these values to the core controller 1740 (for the core controller to load the input values into the activation window buffer(s) interspersed with the computation of dot products by the adder tree circuits 1735).

The adder trees 1735 compute the dot products between the weight values represented in the filter slice buffers 1720 and the input values in the activation window buffer 1730. These adder trees 1735 output partial dot products (e.g., 10-bit values) that are provided to the dot product bus, which combines the partial dot products with other partial dot products as described above. In some embodiments, the number of filter slice buffers in each of the sets 1720 and 1722 is equal to the number of adder trees 1735 in the core, as well as the number of dot product bus lanes, post-processing units, and activation write bus lanes in each segment. Thus, for a typical neural network computation node, the partial dot products computed by the adder trees 1735 in multiple cores having a particular index are aggregated by the dot product bus lane with the same index, that aggregated dot product is provided for post-processing to one of the post-processing units with the same index (i.e., the post-processing unit with that index in one of the channel segments), and the output of the post-processing unit is transported by the activation write bus with the same index to its destination core.

The core controller 1740 configures and coordinates the operation of the read and write controllers 1715 and 1725 in addition to the filter slice buffers 1720, activation window buffer 1730, and adder trees 1735. Furthermore, the core controller 1740 receives the input activations and weights from the read controller 1715, and loads them into the correct slots in the sets of filter slice buffers 1720 and 1722 and the activation window buffers 1730 and 1732 (or directs them to the ALU bus for non-dot product computations). Lastly, when the adder trees 1735 output their partial dot product values, the core controller 1740 sends these values to the dot product bus in the global channel 1745. When the activations for the next layer are output, the activation write bus carries these values to the core controller 1740, which provides them to the write control and cache 1725 to be written to activation memory 1710.

To reduce the circuit area and power required for dot product computations (which use the majority of resources for neural network inference), the partial dot product computation circuits (e.g., the adder trees 1735) of some embodiments map each of a first number of input values to a second number (e.g., 25% of the first number) of dot product inputs, such that each dot product input only receives at most one input value with a non-zero corresponding weight value. Specifically, in some embodiments, the partial dot product computation circuit includes at least two sets of wires for each input (activation) value, with each of the sets of wires for a given input value connected to at least two different dot product inputs (so that each input value can be provided to at least two different inputs). With a guarantee of at least 75% weight sparsity (i.e., at least 75% of the weight values for any set of input values are zero), the number of dot product inputs is set at 25% (or slightly more than 25%, for redundancy) of the number of input values loaded in an activation window for the dot product computation circuit. In some embodiments, the weight sparsity is guaranteed by the training algorithm used to train the weights to perform a specific purpose, and the IC is adaptable for any set of weights that meets the guarantee.

FIG. 18 conceptually illustrates a process 1800 of some embodiments for executing a set of instructions (or a portion of a set of instructions) to compute the output of a neural network node (specifically, a convolutional or fully-connected node). The process 1800 is executed by the computation fabric of an IC, such as that described above. Typically, the process 1800 is executed simultaneously for multiple nodes, and operations 1810-1840 are performed repeatedly for multiple activation windows (i.e., multiple groups of layer input values loaded into the activation window buffer) in order to completely execute a layer (or portion of a layer) of the neural network. In the case of the process 1800, the dot product can be computed in a single cycle and does not involve any split filter slices (i.e., no time-multiplexing is required).

As shown, the process begins (at 1805) by loading the weights for a node into filter slice buffers of one or more cores. In addition, the process loads (at 1810) the input (activation) values for the node into the activation window buffer of these cores. In some embodiments, a set of input values are loaded into one activation window buffer in a core while the weight data for several nodes are loaded into several filter slice buffers of the core. Other embodiments load the weight data into the filter slice buffers first, then load the input values into the activation window buffer. Furthermore, some embodiments load the weight data once for a pass (that computes outputs for many activation nodes), then iteratively load sets of input values and compute dot products for numerous nodes without the need to re-load the weight data. In addition, the weights and activations for a node, in some embodiments, are divided among the filter slice and activation window buffers of all of the cores that are active for the current set of instructions. The storage of the weight and activation values and loading of these values into the filter slice buffer and activation window buffer, respectively, are also described in greater detail below.

The process 1800 then computes (at 1815) partial dot products in the cores. As described above, the activation values loaded into the activation window buffers in each of the active cores are multiplied by their corresponding weight values loaded into the filter slice buffers of these cores. In some embodiments, the size of the partial dot products is reduced as noted above, and with ternary weight values of $\{0, 1, -1\}$, multiplication is avoided.

Next, the process aggregates (at 1820) these partial dot products in the dot product bus. In some embodiments, the partial dot products for a particular node are calculated by the adder tree with the same index (i.e., out of several adder trees) in each of the active cores, and thus these partial dot products are all passed to the same corresponding lane of the dot product bus (which has one lane for each of the adder trees in a core). In some embodiments, the final aggregation is performed by the dot product bus lane in the channel segment of the post-processor selected for the particular node.

The process 1800 then provides (at 1825) the aggregated dot product to an activation post-processor specified by configuration data. This configuration data, in some embodiments, is generated by a compiler and parsed by the hierarchical controller circuits of the neural network chip fabric, and indicates which channel segment will perform the post-processing. Each of the channel segments has an equal number of post-processing units, and the post-processing unit in the selected channel that corresponds to the dot product bus lane that aggregates the dot product is the post-processing unit that receives the aggregated dot product.

At the post-processing unit that receives the aggregated dot product, the process 1800 performs (at 1830) linear function post-processing operations. For all dot products, this includes bias and scale operations, with the values for these operations sent as configuration data from the cluster controller. In addition, certain dot products are aggregated over multiple cycles.

Next, the process 1800 applies (at 1835) the non-linear activation function at the post-processing unit to complete the calculation of the node output value. In some embodiments, a lookup table (e.g., a 5-bit to 4-bit mapping table) or a piecewise linear function is used for this computation. The mapping for each possible set of input bits is provided by configuration data from the cluster controller in some embodiments.

In some embodiments, the operations 1815-1835 are executed to compute the node output without storing any intermediate values in memory. That is, none of the partial dot products are stored in any memories (e.g., RAM) during the computation within the core, and the same is true before and during the aggregation within the dot product bus.

Finally, the process 1800 provides the computed node output to the activation memory partition of the unified memory associated with (or more) of the cores as specified by the configuration data, so that this output can be used as the input to a subsequent set of neural network nodes. In some embodiments, the node output value is carried to the specified core by the activation write bus, with the core index for the value specified by the cluster controller(s).

As noted above, the IC of some embodiments can be embedded into various different types of devices in order to perform different purposes (e.g., face recognition, object categorization, voice analysis, etc.). For each type of device, a network is trained, obeying the sparsity and/or ternary constraints, with the network parameters stored with the IC to be executed by the IC on the device. These devices can include mobile devices, desktop computers, Internet of Things (IoT devices), etc.

Figure 19:
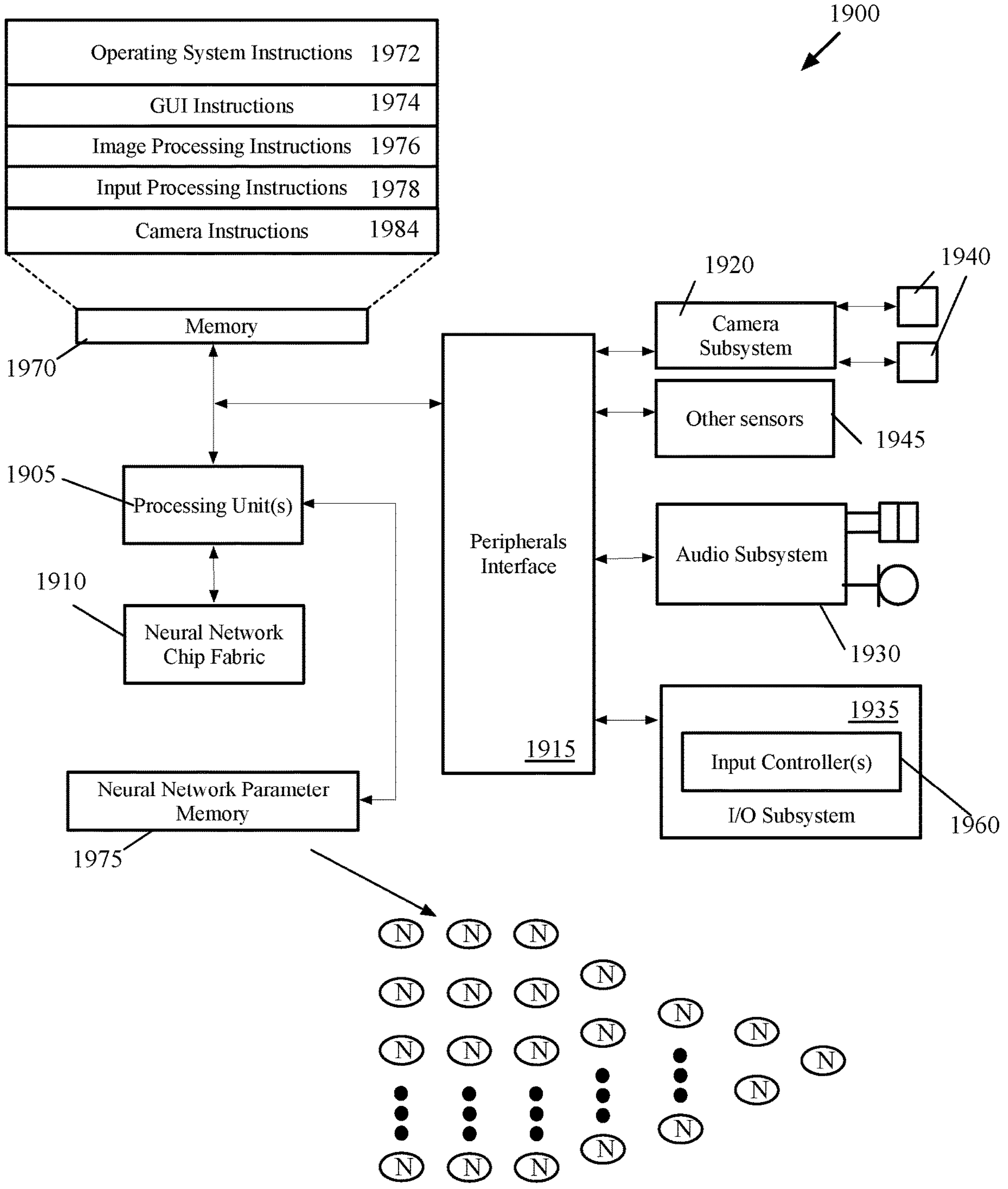
FIG. 19 is an example of an architecture of an electronic device that includes the neural network integrated circuit of some embodiments.

FIG. 19 is an example of an architecture 1900 of an electronic device that includes the neural network integrated circuit of some embodiments. The electronic device may be a mobile computing device such as a smartphone, tablet, laptop, etc., or may be another type of device (e.g., an IoT device, a personal home assistant). As shown, the device 1900 includes one or more general-purpose processing units 1905, a neural network chip fabric 1910, and a peripherals interface 1915.

The peripherals interface 1915 is coupled to various sensors and subsystems, including a camera subsystem 1920, an audio subsystem 1930, an I/O subsystem 1935, and other sensors 1945 (e.g., motion/acceleration sensors), etc. The peripherals interface 1915 enables communication between the processing units 1905 and various peripherals. For example, an orientation sensor (e.g., a gyroscope) and an acceleration sensor (e.g., an accelerometer) can be coupled to the peripherals interface 1915 to facilitate orientation and acceleration functions. The camera subsystem 1920 is coupled to one or more optical sensors 1940 (e.g., charged coupled device (CCD) optical sensors, complementary metal-oxide-semiconductor (CMOS) optical sensors, etc.). The camera subsystem 1920 and the optical sensors 1940 facilitate camera functions, such as image and/or video data capturing.

The audio subsystem 1930 couples with a speaker to output audio (e.g., to output voice navigation instructions). Additionally, the audio subsystem 1930 is coupled to a microphone to facilitate voice-enabled functions, such as voice recognition, digital recording, etc. The I/O subsystem 1935 involves the transfer between input/output peripheral devices, such as a display, a touch screen, etc., and the data bus of the processing units 1905 through the peripherals interface 1915. The I/O subsystem 1935 includes various input controllers 1960 to facilitate the transfer between input/output peripheral devices and the data bus of the processing units 1905. These input controllers 1960 couple to various input/control devices, such as one or more buttons, a touch-screen, etc.

In some embodiments, the device includes a wireless communication subsystem (not shown in FIG. 19) to establish wireless communication functions. In some embodiments, the wireless communication subsystem includes radio frequency receivers and transmitters and/or optical receivers and transmitters. These receivers and transmitters of some embodiments are implemented to operate over one or more communication networks such as a GSM network, a Wi-Fi network, a Bluetooth network, etc.

As illustrated in FIG. 19, a memory 1970 (or set of various physical storages) stores an operating system (OS) 1972. The OS 1972 includes instructions for handling basic system services and for performing hardware dependent tasks. The memory 1970 also stores various sets of instructions, including (1) graphical user interface instructions 1974 to facilitate graphic user interface processing; (2) image processing instructions 1976 to facilitate image-related processing and functions; (3) input processing instructions 1978 to facilitate input-related (e.g., touch input) processes and functions; and (4) camera instructions 1984 to facilitate camera-related processes and functions. The processing units 1905 execute the instructions stored in the memory 1970 in some embodiments.

The memory 1970 may represent multiple different storages available on the device 1900. In some embodiments, the memory 1970 includes volatile memory (e.g., high-speed random access memory), non-volatile memory (e.g., flash memory), a combination of volatile and non-volatile memory, and/or any other type of memory.

The instructions described above are merely exemplary and the memory 1970 includes additional and/or other instructions in some embodiments. For instance, the memory for a smartphone may include phone instructions to facilitate phone-related processes and functions. An IOT device, for instance, might have fewer types of stored instructions (and fewer subsystems), to perform its specific purpose and have the ability to receive a single type of input that is evaluated with its neural network.

The above-identified instructions need not be implemented as separate software programs or modules. Various other functions of the device can be implemented in hardware and/or in software, including in one or more signal processing and/or application specific integrated circuits.

In addition, a neural network parameter memory 1975 stores the weight values, bias parameters, etc. for implementing one or more machine-trained networks by the neural network chip fabric 1910. As mentioned above, different clusters of cores of the fabric 1910 can implement different machine-trained networks in parallel in some embodiments. In different embodiments, these neural network parameters are stored on-chip (i.e., in memory that is part of the neural network chip fabric 1910) or loaded onto the IC 1910 from the neural network parameter memory 1975 via the processing unit(s) 1905.

While the components illustrated in FIG. 19 are shown as separate components, one of ordinary skill in the art will recognize that two or more components may be integrated into one or more integrated circuits. In addition, two or more components may be coupled together by one or more communication buses or signal lines (e.g., a bus between the general-purpose processing units 1905 and the neural network IC 1910, which enables the processing units 1905 to provide inputs to the neural network IC 1910 and receive the outputs of the network from the IC 1910. Also, while many of the functions have been described as being performed by one component, one of ordinary skill in the art will realize that the functions described with respect to FIG. 19 may be split into two or more separate components.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 20:
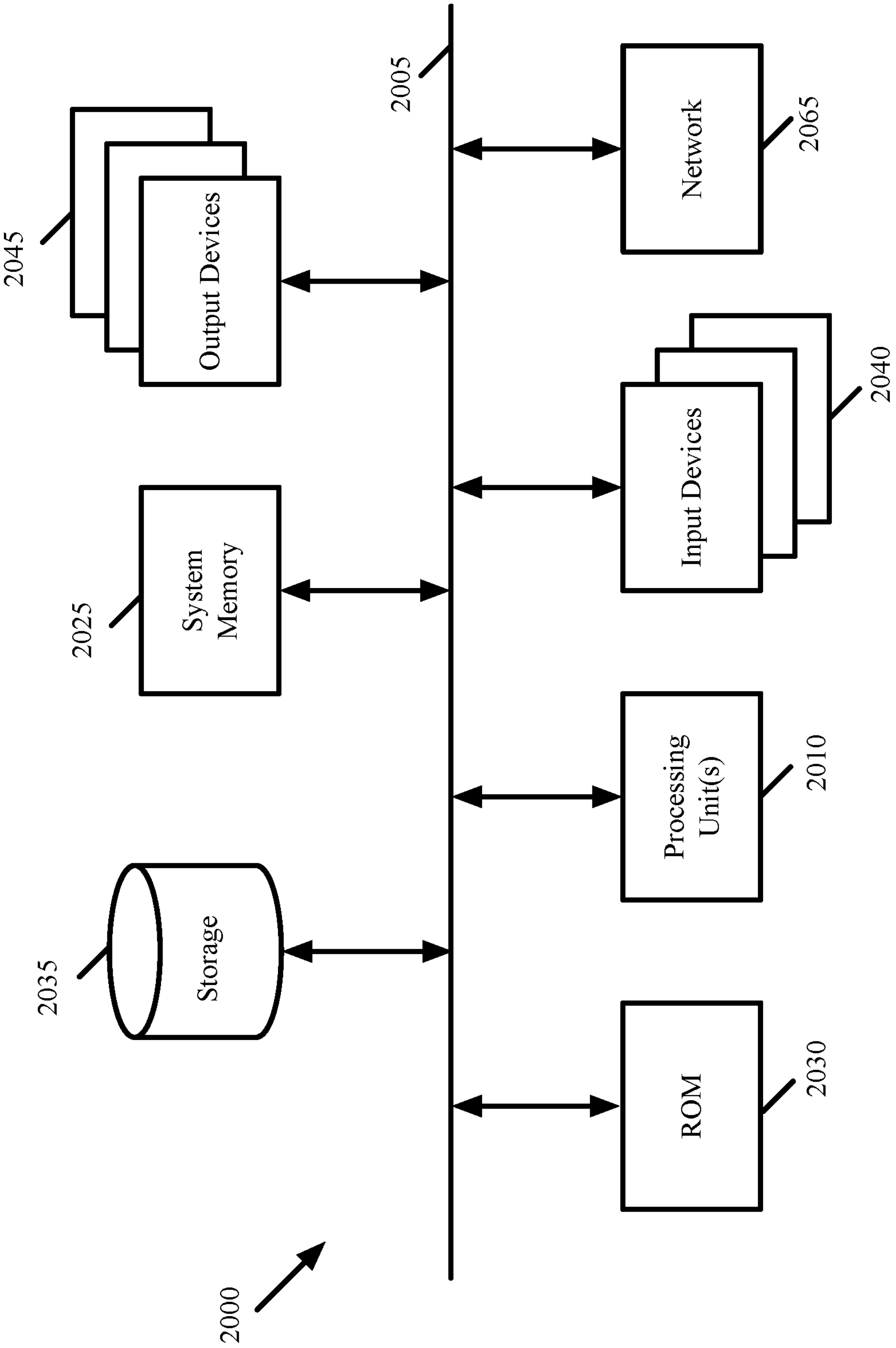
FIG. 20 conceptually illustrates an electronic system with which some embodiments of the invention are implemented.

FIG. 20 conceptually illustrates an electronic system 2000 with which some embodiments of the invention are implemented. The electronic system 2000 can be used to execute any of the control and/or compiler systems described above in some embodiments. The electronic system 2000 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2000 includes a bus 2005, processing unit(s) 2010, a system memory 2025, a read-only memory 2030, a permanent storage device 2035, input devices 2040, and output devices 2045.

The bus 2005 collectively represents all system, peripheral, and chipset buses that communicatively connect the numerous internal devices of the electronic system 2000. For instance, the bus 2005 communicatively connects the processing unit(s) 2010 with the read-only memory 2030, the system memory 2025, and the permanent storage device 2035.

From these various memory units, the processing unit(s) 2010 retrieves instructions to execute and data to process in order to execute the processes of the invention. The processing unit(s) may be a single processor or a multi-core processor in different embodiments.

The read-only-memory (ROM) 2030 stores static data and instructions that are needed by the processing unit(s) 2010 and other modules of the electronic system. The permanent storage device 2035, on the other hand, is a read-and-write memory device. This device is a non-volatile memory unit that stores instructions and data even when the electronic system 2000 is off. Some embodiments of the invention use a mass-storage device (such as a magnetic or optical disk and its corresponding disk drive) as the permanent storage device 2035.

Other embodiments use a removable storage device (such as a floppy disk, flash drive, etc.) as the permanent storage device. Like the permanent storage device 2035, the system memory 2025 is a read-and-write memory device. However, unlike storage device 2035, the system memory is a volatile read-and-write memory, such a random-access memory. The system memory stores some of the instructions and data that the processor needs at runtime. In some embodiments, the invention's processes are stored in the system memory 2025, the permanent storage device 2035, and/or the read-only memory 2030. From these various memory units, the processing unit(s) 2010 retrieves instructions to execute and data to process in order to execute the processes of some embodiments.

The bus 2005 also connects to the input and output devices 2040 and 2045. The input devices enable the user to communicate information and select commands to the electronic system. The input devices 2040 include alphanumeric keyboards and pointing devices (also called "cursor control devices"). The output devices 2045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 20, bus 2005 also couples electronic system 2000 to a network 2065 through a network adapter (not shown). In this manner, the computer can be a part of a network of computers (such as a local area network ("LAN"), a wide area network ("WAN"), or an Intranet, or a network of networks, such as the Internet. Any or all components of electronic system 2000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, some of the figures (including FIGS. 7, 10, 15, and 18) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. An integrated circuit (IC) comprising:

a microprocessor circuit for loading configuration for a neural network and generating instructions for executing the neural network based on the configuration;

a neural network inference circuit for executing the neural network for input data according to the instructions received from the microprocessor circuit, the neural network inference circuit comprising a plurality of cores;

an input processing circuit for receiving data and preparing the input data for the neural network inference circuit;

a unified memory accessible by the microprocessor circuit, the neural network inference circuit, and the input processing circuit, wherein the unified memory comprises a plurality of memory banks, and wherein a first core of the plurality of cores of the neural network inference circuit is configured to have exclusive access from among the plurality of cores to only a respective first subset of dedicated memory banks of the plurality of memory banks, and wherein a second core of the plurality of cores of the neural network inference circuit is configured to have exclusive access from among the plurality of cores to only a second subset of dedicated memory banks of the plurality of memory banks; and at least a first direct connection from the first core of the plurality of cores to a first dedicated memory bank of a first subset of dedicated memory banks, wherein the input processing circuit writes first input data to the first subset of dedicated memory banks and second input data to the second subset of dedicated memory banks, and wherein a logical address of the first subset of dedicated memory banks is swapped with a logical address of the second subset of dedicated memory banks, after executing, by the neural network inference circuit, the first input data.

2. The IC of claim 1, wherein each memory bank of the plurality of memory banks is accessible by the input processing circuit and the microprocessor circuit.

3. The IC of claim 1, wherein each respective memory bank of the plurality of memory banks is associated with a respective core of the plurality of cores of the neural network inference circuit, and wherein each respective memory bank has a same memory configuration.

4. The IC of claim 3, wherein two memory banks have the same memory configuration when a number of physical memories for each of the two memory banks is the same and physical memories of each of the two memory banks have a same size.

5. The IC of claim 1, further comprising at least one direct connection from the first core of the plurality of cores to a first memory bank of a respective subset of dedicated memory banks a second direct connection from the second core of the plurality of cores to a second dedicated memory bank of the second subset of dedicated memory banks.

6. The IC of claim 5, further comprising a crossbar for providing access to each memory bank of the plurality of memory banks of the unified memory to the microprocessor circuit and the input processing circuit.

7. The IC of claim 1, wherein the neural network inference circuit writes weight values to the unified memory based on instructions provided from the microprocessor circuit at bootup of the IC.

8. The IC of claim 7, wherein the neural network inference circuit:

writes a set of input data to the unified memory based on instructions provided by the input processing circuit; and executes the neural network for the input data to generate output data.

9. The IC of claim 8, wherein while executing the neural network for the set of input data the neural network inference circuit reads the set of input data along with a set of weight values from the unified memory, writes sets of intermediate activation values to the unified memory, and reads sets of intermediate activation values along with sets of weight values from the unified memory.

10. The IC of claim 8, wherein the microprocessor circuit stores in the unified memory a program comprising the instructions for the neural network inference circuit to execute the neural network.

11. The IC of claim 10, wherein the program is loaded from off-chip non-volatile storage at bootup of the IC.

12. The IC of claim 1, wherein the neural network inference circuit uses a first address space for addressing the unified memory while the microprocessor circuit and the input processing circuit use the first address space and a second address space for addressing the unified memory.

13. The IC of claim 12, wherein addresses in the first address space decode to specific physical memory locations.

14. The IC of claim 13, wherein:

a first address in the first address space is formatted to include (i) a first address prefix indicating that the first address is formatted in the first address space and (ii) a first physical address portion that refers to a first physical memory location and the first core of the plurality of cores, wherein the first core has exclusive access from among the plurality of cores to the first physical memory location; and a second address in the second address space is formatted to include (i) a second address prefix indicating that the second address is formatted in the second address space and (ii) a first virtual address portion that refers to a first virtual memory address, wherein the first virtual memory address is used to identify a second physical memory location.

15. The IC of claim 14, wherein a mapping table is used to map the first virtual memory address to the second physical memory location.

16. The IC of claim 15, wherein the second address space allows a set of unused physical memory locations associated with two or more different cores of the plurality of cores to be treated as a contiguous block of virtual addresses used to identify the set of unused physical memory locations for access by the microprocessor circuit and the input processing circuit, wherein the set of unused physical memory locations are associated with static random access memory (SRAM).

17. The IC of claim 12, wherein the microprocessor circuit and the input processing circuit use the first address space for addressing the unified memory when reading and writing data that is also accessed by the neural network inference circuit.

18. The IC of claim 17, wherein the microprocessor circuit and the input processing circuit use the second address space for addressing the unified memory when reading and writing data that is not accessed by the neural network inference circuit.

19. The IC of claim 1, wherein the neural network is a first neural network, wherein the plurality of cores of the neural network inference circuit are separated into at least a first cluster of cores and a second cluster of cores.

20. The IC of claim 19, wherein the first cluster of cores is configured to execute the first neural network, and wherein the second cluster of cores is configured to execute a second neural network at a same time as the first neural network is executed.

* * * * *